(12) United States Patent
Yang et al.

(10) Patent No.: US 11,563,565 B2
(45) Date of Patent: Jan. 24, 2023

(54) SYSTEM AND METHOD FOR COMPUTING PRIVATE KEYS FOR SELF CERTIFIED IDENTITY BASED SIGNATURE SCHEMES

(71) Applicant: Huawei International Pte. Ltd., Singapore (SG)

(72) Inventors: Yanjiang Yang, Singapore (SG); Guilin Wang, Singapore (SG); Tieyan Li, Singapore (SG)

(73) Assignee: Huawei International Pte. Ltd., Singapore (SG)

( * ) Notice: Subject to any disclaimer, the term of this patent is extended or adjusted under 35 U.S.C. 154(b) by 481 days.

(21) Appl. No.: 16/535,437

(22) Filed: Aug. 8, 2019

(65) Prior Publication Data

US 2019/0372763 A1 Dec. 5, 2019

Related U.S. Application Data

(63) Continuation of application No. PCT/SG2018/050050, filed on Feb. 7, 2018.

(30) Foreign Application Priority Data

Feb. 9, 2017 (SG) .............. 10201701044S

(51) Int. Cl.
*H04L 9/08* (2006.01)
*H04L 9/00* (2022.01)
*H04L 9/32* (2006.01)

(52) U.S. Cl.
CPC ............ *H04L 9/0847* (2013.01); *H04L 9/008* (2013.01); *H04L 9/0869* (2013.01); *H04L 9/3263* (2013.01)

(58) Field of Classification Search
CPC ....... H04L 63/08; H04L 9/008; H04L 9/0847; H04L 9/3218; H04L 9/3263
See application file for complete search history.

(56) References Cited

U.S. PATENT DOCUMENTS

| 5,521,980 A | * | 5/1996 | Brands | .................. | H04L 9/3257 |
| | | | | | 713/180 |
| 7,353,395 B2 | * | 4/2008 | Gentry | ............... | G06Q 20/3829 |
| | | | | | 713/169 |
| 7,487,539 B2 | * | 2/2009 | Ramachandran | ..... | H04L 9/3263 |
| | | | | | 726/10 |

(Continued)

FOREIGN PATENT DOCUMENTS

| CN | 101547099 A | 9/2009 |
| CN | 101702804 A | 5/2010 |

(Continued)

OTHER PUBLICATIONS

Petersen et al.,"Self-certified keys—Concepts and Applications," Communication and Multimedia Security. vol. 3, XP000828383, pp. 102-116 (Sep. 1997).

(Continued)

*Primary Examiner* — Lizbeth Torres-Diaz
(74) *Attorney, Agent, or Firm* — Leydig, Voit & Mayer, Ltd.

(57) ABSTRACT

A system and method generate private keys for devices participating in a self-certified identity based encryption scheme. A private key is used by the devices to establish a common session key for encoding digital communications between devices.

23 Claims, 5 Drawing Sheets

(56) References Cited

U.S. PATENT DOCUMENTS

| | | | | |
|---|---|---|---|---|
| 7,930,542 | B2* | 4/2011 | Ganesan | H04L 63/0823 726/28 |
| 8,464,058 | B1* | 6/2013 | Chen | H04L 9/0844 713/168 |
| 9,106,410 | B2* | 8/2015 | Sundaram | H04L 9/3073 |
| 2006/0215837 | A1* | 9/2006 | Chen | H04L 9/0847 380/44 |
| 2008/0000969 | A1 | 1/2008 | Salomonsen et al. | |
| 2011/0289319 | A1* | 11/2011 | Elwell | H04L 63/123 713/176 |
| 2014/0331309 | A1* | 11/2014 | Spiers | H04L 63/0281 726/12 |
| 2016/0072775 | A1* | 3/2016 | Choi | H04L 63/061 713/171 |
| 2016/0330017 | A1* | 11/2016 | Youn | H04L 9/008 |
| 2016/0344557 | A1* | 11/2016 | Chabanne | H04L 9/3066 |

FOREIGN PATENT DOCUMENTS

| | | | |
|---|---|---|---|
| CN | 102017510 A | 4/2011 | |
| CN | 104486307 A | 4/2015 | |
| CN | 104539423 A | 4/2015 | |
| CN | 105162585 A | 12/2015 | |
| CN | 105959269 A | 9/2016 | |
| CN | 106161405 A | 11/2016 | |
| CN | 106341232 A | 1/2017 | |
| EP | 0661846 B1 * | 10/2001 | H04L 9/302 |
| JP | 2011232475 A | 11/2011 | |

OTHER PUBLICATIONS

Saeednia "Identity-Based and Self-Certified Key-Exchange Protocols" XP55092407, pp. 1-13, Springer-Verlag, Berlin/Heidelberg (1997).

Schridde et al. "An Identity-Based Security Infrastructure for Cloud Environments," XP031727359, pp. 644-649, Institute of Electrical and Electronics Engineers, New York, New York (2010).

Peng et al., "Improved TLS Handshake Protocols Using Identity-Based Cryptography," 2009 International Symposium on Information Engineering and Electronic Commerce, pp. 135-139, Institute of Electrical and Electronics Engineers, New York, New York (2009).

Wöhrl, "TLS Solutions for Wireless Sensor Networks," Network Architectures and Services, pp. 31-37 (Aug. 2012).

Huang, "Identity-Based Encryption (IBE) Cipher Suites for Transport Layer Security (TLS) draft-huang-tls-ibe-00," pp. 1-16 (Jul. 3, 2009).

Cakulev et al,"IBAKE: Identity-Based Authenticated Key Exchange," RFC 6539, pp. 1-13 (Mar. 2012).

Shamir, "Identity-Based Cryptosystems and Signature Schemes," In Proc. Advances in Cryptology, CRYPTO 1984, Lecture Notes in Computer Science, pp. 47-53,Springer-Verlag Berlin Heidelberg (1985).

Groves, "Elliptic Curve-Based Certificateless Signatures for Identity-Based Encryption (ECCSI)," RFC6507, pp. 1-17, Internet Engineering Task Force, Reston, Virginia (Feb. 2012).

Garcia-Morchon et al, "DTLS-HIMMO: Achieving DTLS Certificate Security with Symmetric Key Overhead," In Proc. 20th European Symposium on Research in Computer Security—ESORICS 2015, Part 1, LNCS 9326, pp. 224-242, Springer International Publishing Switzerland (2015).

Blundo et al., "Perfectly Secure Key Distribution for Dynamic Conference," Information and Computation, vol. 146, Article No. IC982717, pp. 1-23, Academic Press (1998).

Zhu, et al., "An Efficient Identity-Based Key Exchange Protocol with KGS Forward Secrecy for Low-Power Devices," pp. 500-509 (2005).

Dierks et al., "The Transport Layer Security (TLS) Protocol Version 1.2," rfc5246, pp. 1-104 (Aug. 2008).

Schnorr, "Efficient Identification and Signatures for Smart Cards," Advances in Cryptology, CRYPTO '89, LNCS 434, pp. 239-252 (1989).

Chen et al., "Applications of Multiple Trust Authorities in Pairing Based Cryptosystems," pp. 1-17 (2003).

Zhang et al., "A Cross-Domain Alliance Authentication Scheme based on Bilinear Group," Applied Mathematics & Information Sciences 8, No. 3, pp. 1313-1317, Natural Sciences Publishing Cor. (2014).

Paillier, "Public-Key Cryptosystems Based on Composite Degree Residuosity Classes," EUROCRYPT '99, LNCS 1592, pp. 223-238 (1999).

Li et al, "OACerts: Oblivious Attribute Certificates," IEEE Transactions on Dependable and Secure Computing, vol. 3, No. 4, pp. 340-352 (Oct.-Dec. 2006).

Neuman et al., "The Kerberos Network Authentication Service (V5)," rfc 4120, pp. 1-138 (Jul. 2005).

Blake-Wilson et al., "Elliptic Curve Cryptography (ECC) Cipher Suites for Transport Layer Security (TLS)," rfc 4492, pp. 1-35 (May 2006).

"Information technology—Security techniques—Lightweight cryptography, Part 4: Mechanisms using asymmetric techniques," ISO/IEC 29192-4, pp. 1-6 (Jun. 2013).

Xuefei Cao, "Study on Theory and Applications of Identity-Based Authentication Protocols," Xidian University, total 143 pages (Jul. 2009). With English translation of related pages and abstract.

CN/201880011027.7, Office Action/Search Report, dated Jun. 1, 2022.

* cited by examiner

SYSTEM AND METHOD FOR COMPUTING PRIVATE KEYS FOR SELF CERTIFIED IDENTITY BASED SIGNATURE SCHEMES

CROSS-REFERENCE TO RELATED APPLICATIONS

This application is a continuation of International Application No. PCT/SG2018/050050, filed on Feb. 7, 2018, which claims priority to Singaporean Patent Application No. SG10201701044S, filed on Feb. 9, 2017. The disclosures of the aforementioned applications are hereby incorporated by reference in their entireties.

FIELD OF TECHNOLOGY

This application relates to a system and method for generating private keys for devices participating in self-certified identity based signature schemes whereby the private keys are used by the devices to establish a common session key for encoding digital communications between devices. In particular, the private keys generated in accordance with the system and methods of the application are only made known to the devices themselves and not by any other third parties.

BACKGROUND

Due to a convergence of multiple technologies, an ever increasing number of devices are now able to seamlessly communicate wirelessly with the Internet or wirelessly exchange communications between themselves. This convergence has resulted in the vision of the Internet of Things (IoT) gaining more traction through recent years. In the Internet of Things, millions of entities or devices (i.e. Things) will be connected to one another. These devices, which comprise devices or entities such as smart chips, smart plugs, smart watches, smart phones, smart vehicles, smart buildings, and etc., either communicate directly with one another or via the Internet.

As the Internet of Things spreads into more areas, these devices become more prone to cyber-attacks from hackers or unauthorized users as a compromised device would grant a malicious user access to the network to which the device belongs. Hence, it is of utmost importance that a security protocol be set in place to allow one entity to verify the authenticity of a peer entity, with which it communicates with, before data is exchanged between these two entities. In addition to the above, once the authenticity of the entities have been verified, a secret key known to only these two entities, has to be established to facilitate the signing of data messages between these entities. This is to ensure that data communicated between these two entities will not be compromised even if the data were intercepted or redirected.

A common method of establishing a secret key for signing data communications between entities involves the pre-sharing of a common symmetric secret key between the relevant parties. For such a method, data messages that are to be transmitted between the entities will be signed using this pre-shared or pre-agreed-upon secret key. If the receiving entity is able to decrypt the received message using this pre-shared secret key, this implies that the authenticity of the sender has been verified and the receiver may then proceed to process the decrypted message accordingly. Unfortunately, this method is not scalable and is quite inflexible as it requires the common secret to be pre-shared or communicated to all trusted entities or devices before the entities or devices may communicate with one another. In the IoT setting, the high mobility of devices is a norm and devices that are required to exchange data with one another may not have had the opportunity to establish a secret key beforehand.

Another approach that has been proposed utilizes public key infrastructure (PKI) based solutions whereby key-pairs allocated to each authorized entity are bound to its holders by means of a public key certificate. The key pair then utilizes a public key cryptosystem such as public-key encryption or digital signature methodologies to sign data messages or to verify the authenticity of a sender by validating the public key certificate of the sender. The setup and maintenance of such public key infrastructures are notoriously expensive and require entities to constantly maintain contact with a PKI server to validate the respective public key certificates.

Yet another approach that has been proposed utilizes identity based cryptography methodologies to authenticate entities and to sign data messages. Such identity based cryptosystems are special public key cryptosystems, which are based on bilinear pairing and utilize an entity's identity, such as user name, email address, telephone number, IP address, etc. as the public key and a corresponding private key is then derived from the entity's identity by a Key Generation Centre which contains a master secret key, which is utilized in the generation of private keys for entities. The downside of this approach is that bilinear pairing is an expensive and time consuming computation process.

Another inherent weakness of existing identity based cryptographic schemes is that users' private keys are usually generated by a Key Generation Centre. As the users' private keys are escrowed to the key generation centre, this means that the key generation centre will possess all the private keys of the users of the scheme. If the key generation centre were ever to become compromised, this would mean that all the users of the system would be compromised as well.

For the above reasons, those skilled in the art are constantly striving to come up with a system and method to generate private keys for users of an identity based signature scheme whereby the private keys are only made known to each respective user. The private keys are then utilized with the identity based signature scheme to verify the authenticity of users of the scheme and to generate a common session key that is to be used to encode data messages between verified users.

SUMMARY

The above and other problems are solved and an advance in the art is made by systems and methods provided by embodiments in accordance with the application.

A first advantage of embodiments of systems and methods in accordance with the application is that the private keys of devices or entities belonging to the self-certified identity based signature scheme are made known only to the devices themselves and are not escrowed out to any external third parties such as a Key Generating Centre.

A second advantage of embodiments of systems and methods in accordance with the application is that the private keys generated in accordance with embodiments of the application are of the same form as in existing self-certified identity based signature schemes and thus may be used in existing self-certified identity based signature schemes without changing the operation of existing self-certified identity based signature schemes.

A third advantage of embodiments of systems and methods in accordance with the application is that the application allows cross-domain authenticated key exchange to take place whereby users' or entities' respective private keys may be issued by different key generation centres whereby each centre has its own unique system parameters.

A fourth advantage of embodiments of systems and methods in accordance with the application is that the application may be utilized in Transport Layer Security (TLS) or Datagram Transport Layer Security (DTLS) protocols whereby a self-certified identity based signature scheme in accordance with embodiments of the application may be used to sign messages for TLS protocol or DTLS protocol.

The above advantages are provided by embodiments of a method in accordance with the application operating in the following manner. For brevity, in the subsequent description of the embodiments of the application, although multiplicative notations are utilized for finite field arithmetic operations; it should be straightforward for a person skilled in the art to realize that the arithmetic operations should be described using additive notations when implemented over elliptic curves.

According to a first aspect of the application, a system for computing a private key sk for a device participating in a self-certified identity based signature system comprises a secure server configured to: compute parameters for the device based on a second random number $r_{i2}$ generated by the secure server, a first set of components received from the device, a master secret key x and parameters associated with a master public key mpk, wherein the first set of components comprises a first random number $r_{i1}$ generated by the device, transmit the computed parameters to the device; and the device configured to compute the private key sk based on the received computed parameters and the random number $r_{i1}$.

With reference to the first aspect, in accordance with embodiments of the application, the step of computing the parameters for the device comprises: retrieving an arbitrary first value $R_{i1}$ and an identity of the device $id_i$ from the first set of components, wherein the arbitrary first value $R_{i1}$ is generated based on the first random number $r_{i1}$; computing an arbitrary value of the device $R_i$ and a first integer $s_{i1}$; and setting the computed arbitrary value of the device $R_{i1}$ and the first integer $s_{i1}$; as the parameters for the device, whereby the arbitrary value of the device $R_{i1}$ is computed based on the arbitrary first value $R_{i1}$ and the second random number $r_{i2}$; and whereby the first integer $s_{i1}$ is computed based on the second random number $r_{i2}$, the master secret key x, the arbitrary value of the device $R_i$, the identity of the device $id_i$ and a prime number q obtained from the parameters associated with the master public key mpk.

With reference to the first aspect, in accordance with embodiments of the application, the step of computing the private key sk comprises: computing an integer $s_i$ based on the first integer $s_{i1}$ as retrieved from the computed parameters transmitted from the secure server, the first random number $r_{i1}$, and a prime number q as obtained from the parameters associated with the master public key mpk; and forming the private key sk based on the arbitrary value of the device $R_i$ and the integer $s_i$.

With reference to the first aspect, in accordance with embodiments of the application, the arbitrary value of the device $R_i$ is defined by $R_i = R_{i1} \cdot g^{r_{i2}}$ or $R_i = R_{i1}/g^{r_{i2}}$, the arbitrary first value $R_{i1}$ is defined by $R_{i1} = g^{r_{i1}}$ and the first integer $s_{i1}$ is defined by $s_{i1} = r_{i2} + xH(R_i, id_i) \pmod{q}$ or $s_{i1} = -r_{i2} + xH(R_i, id_i) \pmod{q}$ where H( ) is a collision-resistant hash function.

With reference to the first aspect, in accordance with embodiments of the application, the integer $s_i$ is defined by $s_i = s_{i1} + r_{i1} \pmod{q}$.

With reference to the first aspect, in accordance with embodiments of the application, the arbitrary value of the device $R_i$ is defined by $R_i = g^{r_{i2}}/R_{i1}$, the arbitrary first value $R_{i1}$ is defined by $R_{i1} = g^{r_{i1}}$ and the first integer $s_{i1}$ is defined by $s_{i1} = r_{i2} + xH(R_i, id_i) \pmod{q}$ where H( ) is a collision-resistant hash function.

With reference to the first aspect, in accordance with embodiments of the application, the integer $s_i$ is defined by $s_i = s_{i1} - r_{i1} \pmod{q}$.

With reference to the first aspect, in accordance with embodiments of the application, the step of computing the parameters for the device comprises: retrieving an arbitrary first value $R_{i1}$, an identity of the device $id_i$ and a homomorphic encryption value c from the first set of components, wherein the arbitrary first value $R_{i1}$ is generated based on the first random number $r_{i1}$ and the homomorphic encryption value c is generated by providing the first random number $r_{i1}$ and a prime number q obtained from the parameters associated with the master public key mpk to an additive homomorphic encryption function HEnc( ); setting an arbitrary value of the device $R_i$ and a first integer $s_{i1}$ as the parameters for the device, whereby the arbitrary value of the device $R_i$ is computed based on the arbitrary first value $R_{i1}$ and the second random number $r_{i2}$; and whereby the first integer $s_{i1}$ is computed by providing the second random number $r_{i2}$, the homomorphic encryption value c, the master secret key x, the arbitrary value of the device $R_i$, the identity of the device $id_i$ and the prime number q to the additive homomorphic encryption function HEnc( ).

With reference to the first aspect, in accordance with embodiments of the application, the step of computing the private key sk comprises: computing an integer $s_i$ by applying a complementary homomorphic decryption function to the first integer $s_{i1}$ as retrieved from the computed parameters transmitted from the secure server; and forming the private key sk based on the arbitrary value of the device $R_i$ and the integer $s_i$.

With reference to the first aspect, in accordance with embodiments of the application, the arbitrary value of the device $R_i$ is defined by $R_i = (R_{i1})^{r_{i2}}$, the arbitrary first value $R_{i1}$ is defined by $R_{i1} = g^{r_{i1}}$, the homomorphic encryption value c is defined by $c = HEnc(r_{i1}^{-1} \mod q)$ and the first integer $s_{i1}$ is defined by $s_{i1} = HEnc(r_{i2}) \cdot c^{xH(R_i, id_i) \mod q}$ where HEnc( ) is the additive homomorphic encryption function.

With reference to the first aspect, in accordance with embodiments of the application, the arbitrary value of the device $R_i$ is defined by $R_i = (R_{i1})^{r_{i1}^{-1}}$, the arbitrary first value $R_{i1}$ is defined by $R_{i1} = g^{r_{i1}}$ the homomorphic encryption value c is defined by $c = HEnc(r_{i1}^{-1})$ and the first integer $s_{i1}$ is defined by $s_{i1} = HEnc(r_{i2}^{-1}) \cdot c^{xH(R_i, id_i) \mod q}$ where HEnc( ) is the additive homomorphic encryption function.

With reference to the first aspect, in accordance with embodiments of the application, the integer $s_i$ is defined by $s_i = r_{i1} HDec(s_{i1})$; where HDec( ) is the complementary homomorphic decryption function.

With reference to the first aspect, in accordance with embodiments of the application, the arbitrary value of the device $R_i$ is defined by $R_i = (R_{i1})^{r_{i2}}$, the arbitrary first value $R_{i1}$ is defined by $R_{i1} = g^{r_{i1}}$, the homomorphic encryption value c is defined by $c = HEnc(r_{i1})$ and the first integer $s_{i1}$ is defined by $s_{i1} = HEnc(r_{i2}) \cdot c^{xH(R_i, id_i) \mod q}$ where HEnc( ) is the additive homomorphic encryption function.

With reference to the first aspect, in accordance with embodiments of the application, the integer $s_i$ is defined by $s_i = r_{i1}^{-1} \text{HDec}(s_{i1})$ where HDec( ) is the complementary homomorphic decryption function.

According to a second aspect of the application, a system for generating a common session key SK for encoding digital communications between a first device i and a second device j that are participating in a self-certified identity based signature scheme is disclosed, the system comprising: a secure server configured to instruct: the first device to compute a private key ski based on a first set of parameters received from the secure server, and a random number $r_{i1}$ generated by the first device, wherein the first set of parameters is generated by the secure server based on a second random number $r_{i2}$ generated by the secure server, a first set of components comprising the first random number $r_{i1}$, a master secret key x and parameters associated with a master public key mpk, wherein the first set of components is generated by the first device and transmitted to the secure server, and the second device to compute a private key $sk_j$ based on a second set of parameters received from the secure server, and a random number $r_{j1}$ generated by the second device, wherein the second set of parameters is generated by the secure server based on a second random number $r_{j2}$ generated by the secure server, a second set of components comprising the first random number $r_{j1}$, the master secret key x and the parameters associated with a master public key mpk, wherein the second set of components is generated by the second device and transmitted to the secure server; the first device configured to: sign a group element $g^a$ using a self-certified Identity Based Signature Scheme and the private key ski, where a is a random number generated by the first device and g is a generator of a cyclic group G; transmit an identity of the first device $id_i$, the group element $g^a$ and the signed group element $g^a$ to the second device; upon receiving the transmission, the second device is configured to: verify the signed group element $g^a$ using a verification function associated with the self-certified Identity Based Signature Scheme and the identity of the first device $id_i$, sign group elements $(g^a \| g^b)$ using the self-certified Identity Based Signature Scheme and the private key $sk_j$, where b is a random number generated by the first device, when the signed group element g a is verified, and transmit the signed group elements $(g^a \| g^b)$ and a group element $g^b$ to the first device; the first device is configured to: verify the signed group elements $(g^a \| g^b)$ using the verification function associated with the self-certified Identity Based Signature Scheme and the identity of the second device $id_j$; compute a first shared secret $k_{ij}$ based on the group element a and the group element $g^b$, compute a first key $vk_i$ by providing the first shared secret $k_{ij}$ to a Key Deriving Function, and compute a first authentication data $Ad_i$ by providing the first key $vk_i$ to an Authentication Data Deriving Function, when the signed group elements $(g^a \| g^b)$ are verified; generate the common session key SK by providing the first shared secret $k_{ij}$ to the Key Deriving Function; transmit the first authentication data $Ad_i$ to the second device, such that upon receiving the first authentication data $Ad_i$, the second device is configured to: compute a second shared secret $k_{ji}$ based on the group element $g^a$ and the group element b, compute a second key $vk_j$ by providing the second shared secret $k_{ji}$ to the Key Deriving Function, compute a second authentication data $Ad_j$ by providing the key $vk_j$ to the Authentication Data Deriving Function, determine if the second authentication data $Ad_j$ matches with the first authentication data $Ad_i$; and generate the common session key SK by providing the second shared secret $k_{ji}$ to the Key Deriving Function, when the second authentication data $Ad_j$ matches with the first authentication data $Ad_i$.

With reference to the second aspect, in accordance with embodiments of the application, the step of generating the first set of parameters for the first device comprises: the secure server being configured to: retrieve an arbitrary first value $R_{i1}$ and an identity of the first device $id_i$ from the first set of components, wherein the arbitrary first value $R_{i1}$ is generated based on the first random number $r_{i1}$; compute an arbitrary value of the first device $R_i$ and a first integer $s_{i1}$; and set the computed arbitrary value of the first device $R_i$ and the first integer $s_{i1}$ as the parameters for the first device, whereby the arbitrary value of the first device $R_i$ is computed based on the arbitrary first value $R_{i1}$ and the second random number $r_{i2}$; and whereby the first integer $s_{i1}$ is computed based on the second random number $r_{i2}$, the master secret key x, the arbitrary value of the first device $R_i$, the identity of the first device $id_i$ and a prime number q obtained from the parameters associated with the master public key mpk.

With reference to the second aspect, in accordance with embodiments of the application, the computing the private key ski comprises: the first device being configured to: compute an integer $s_i$ based on the first integer $s_{i1}$ as retrieved from the first set of parameters, the first random number $r_{i1}$, and a prime number q as obtained from the parameters associated with the master public key mpk.; and form the private key ski based on the arbitrary value of the first device $R_i$ and the integer $s_i$.

With reference to the second aspect, in accordance with embodiments of the application, the generating the second set of parameters for the second device comprises: the secure server being configured to: retrieve an arbitrary first value $R_{j1}$ and an identity of the second device $id_j$ from the second set of components, wherein the arbitrary first value $R_{j1}$ is generated based on the first random number $r_{j1}$; compute an arbitrary value of the second device $R_j$ and a first integer $s_{j1}$; and set the computed arbitrary value of the second device $R_j$ and the first integer $s_{j1}$ as the parameters for the second device, whereby the arbitrary value of the second device $R_j$ is computed based on the arbitrary first value $R_{j1}$ and the second random number $r_{j2}$; and whereby the first integer $s_{j1}$ is computed based on the second random number $r_{j2}$, the master secret key x, the arbitrary value of the second device $R_j$, the identity of the second device $id_j$ and a prime number q obtained from the parameters associated with the master public key mpk.

With reference to the second aspect, in accordance with embodiments of the application, the computing the private key $sk_j$ comprises: the second device being configured to: compute an integer $s_j$ based on the first integer $s_{j1}$ as retrieved from the second set of parameters, the first random number $r_{j1}$, and a prime number q as obtained from the parameters associated with the master public key mpk; and form the private key $sk_j$ based on the arbitrary value of the second device $R_j$ and the integer $s_j$.

According to a third aspect of the application, a system for generating a common session key SK for encoding digital communications between a first device i and a second device j participating in a self-certified identity based signature scheme is provided, the system comprising: a secure server configured to instruct: the first device to compute a private key $sk_i$ based on a first set of parameters received from the secure server, and a random number $r_{i1}$ generated by the first device, wherein the first set of parameters is generated by the secure server based on a second random number $r_{i2}$ generated by the secure server, a first set of components comprising the first random number $r_{i1}$, a master secret key x and parameters associated with a master public key mpk, wherein the first set of components is generated by the first device and transmitted to the secure server, and the second device to compute a private key $sk_j$ based on a second set of parameters received from the secure server, and a random number $r_{j1}$ generated by the second device, wherein the second set of parameters is generated by the secure server based on a second random number $r_{j2}$ generated by the secure server, a second set of components comprising the first random number $r_{j1}$, the master secret key x and the parameters associated with a master public key mpk, wherein the second set of components is generated by the second device and transmitted to the secure server; the first device configured to: sign a cryptographic nonce Ni using a self-certified Identity Based Signature Scheme and the private key $sk_i$; transmit an identity of the first device $id_i$, the cryptographic nonce $N_i$ and the signed cryptographic nonce $N_i$ to the second device; upon receiving the transmission, the second device is configured to: verify the signed cryptographic nonce $N_i$ using a verification function associated with the self-certified Identity Based Signature Scheme and the identity of the first device $id_i$, sign cryptographic nonces $(N_i \| N_j)$ using the self-certified Identity Based Signature Scheme and the private key $sk_j$, where $N_j$ is a cryptographic nonce, when the signed cryptographic nonce $N_i$ is verified, and transmit the signed cryptographic nonces $(N_i, N_j)$ and the cryptographic nonce $N_j$ to the first device; the first device is configured to: verify the signed cryptographic nonces $(N_i \| N_j)$ using the verification function associated with the self-certified Identity Based Signature Scheme and the identity of the second device $id_j$, compute a first shared secret $k_{ij} = g^{sj \cdot si}$, compute a first key $vk_i$ by providing the first shared secret $k_{ij}$ to a Key Deriving Function, and compute a first authentication data $Ad_i$ by providing the cryptographic nonces $N_i$ and $N_j$ and the first key $vk_i$ to an Authentication Data Deriving Function, when the signed cryptographic nonces $(N_i \| N_j)$ are verified; generate the common session key SK by providing the first shared secret $k_{ij}$ and the cryptographic nonces $N_i$ and $N_j$ to the Key Deriving Function; transmit the first authentication data $Ad_i$ to the second device; upon receiving the first authentication data $Ad_i$, the second device is configured to: compute a second shared secret $k_{ji} = g^{sj \cdot si}$, compute a second key $vk_j$ by providing the second shared secret $k_{ji}$ to the Key Deriving Function, compute a second authentication data $Ad_j$ by providing the key $vk_j$ and the cryptographic nonces $N_i$ and $N_j$ to the Authentication Data Deriving Function, determine if the second authentication data $Ad_j$ matches with the first authentication data $Ad_i$; and generate the common session key SK by providing the second shared secret $k_{ji}$ to the Key Deriving Function, when the second authentication data $Ad_j$ matches with the first authentication data $Ad_i$.

With reference to the third aspect, in accordance with embodiments of the application, the generating the first set of parameters for the first device comprises: the secure server being configured to: retrieve an arbitrary first value $R_{i1}$ and an identity of the first device $id_i$ from the first set of components, wherein the arbitrary first value $R_{i1}$ is generated based on the first random number $r_{i1}$; compute an arbitrary value of the first device $R_i$ and a first integer $s_{i1}$; and set the computed arbitrary value of the first device $R_i$ and the first integer $s_{i1}$ as the parameters for the first device, whereby the arbitrary value of the first device $R_i$ is computed based on the arbitrary first value $R_{i1}$ and the second random number $r_{i2}$; and whereby the first integer $s_{i1}$ is computed based on the second random number $r_{i2}$, the master secret key x, the arbitrary value of the first device $R_i$, the identity of the first device $id_i$ and a prime number q obtained from the parameters associated with the master public key mpk.

With reference to the third aspect, in accordance with embodiments of the application, the computing the private key $sk_i$ comprises: the first device being configured to: compute an integer $s_i$ based on the first integer $s_{i1}$ as retrieved from the first set of parameters, the first random number $r_{i1}$, and a prime number q as obtained from the parameters associated with the master public key mpk; and form the private key $sk_i$ based on the arbitrary value of the first device $R_i$ and the integer $s_i$.

With reference to the third aspect, in accordance with embodiments of the application, the generating the second set of parameters for the second device comprises: the secure server being configured to: retrieve an arbitrary first value $R_{j1}$ and an identity of the second device $id_j$ from the second set of components, wherein the arbitrary first value $R_{j1}$ is generated based on the first random number $r_{j1}$; compute an arbitrary value of the second device $R_j$ and a first integer $s_{j1}$; and set the computed arbitrary value of the second device $R_j$ and the first integer $s_{j1}$ as the parameters for the second device, whereby the arbitrary value of the second device $R_j$ is computed based on the arbitrary first value $R_{j1}$ and the second random number $r_{j2}$; and whereby the first integer $s_{j1}$ is computed based on the second random number $r_{j2}$, the master secret key x, the arbitrary value of the second device $R_j$, the identity of the second device $id_j$ and a prime number q obtained from the parameters associated with the master public key mpk.

With reference to the third aspect, in accordance with embodiments of the application, the computing the private key $sk_j$ comprises: the second device being configured to: compute an integer $s_j$ based on the first integer $s_{j1}$ as retrieved from the second set of parameters, the first random number $r_{j1}$, and a prime number q as obtained from the parameters associated with the master public key mpk; and form the private key $sk_j$ based on the arbitrary value of the second device $R_j$ and the integer $s_j$.

According a fourth aspect of the application, a system for generating a common session key SK for encoding digital communications between a first device i and a second device j that are participating in a self-certified identity based signature scheme is provided, the system comprising: a first secure server configured to instruct: the first device to compute a private key $sk_i$ based on a first set of parameters received from the first secure server, and a random number $r_{i1}$ generated by the first device, wherein the first set of parameters is generated by the first secure server based on a second random number $r_{i2}$ generated by the first secure server, a first set of components comprising the first random number $r_{i1}$, a master secret key x, and parameters associated with a master public key $mpk_i$, wherein the first set of components is generated by the first device and transmitted to the first secure server; a second secure server configured to instruct: the second device to compute a private key $sk_j$ based on a second set of parameters received from the second secure server, and a random number $r_{j1}$ generated by the second device, wherein the second set of parameters is generated by the second secure server based on a second random number $r_{j2}$ generated by the second secure server, a second set of components comprising the first random number $r_{j1}$, a master secret key $x_j$ and the parameters associated with a master public key $mpk_j$, wherein the second set of components is generated by the second device and transmitted to the second secure server, wherein the first secure server is located in a different domain from the second secure server; the first device configured to: sign a group element $g^a$ using a self-certified Identity Based Signature Scheme and the private key $sk_i$, where a is a random number generated by the first device and g is a generator of a cyclic group G; transmit an identity of the first device $id_i$, the group element $g^a$ and the signed group element $g^a$ to the second device; upon receiving the transmission, the second device is configured to: verify the signed group element $g^a$ using a verification function associated with the self-certified Identity Based Signature Scheme and the identity of the first device $id_i$, sign group elements $(g^a \| g^b)$ using the self-certified Identity Based Signature Scheme and the private key $sk_j$, where b is a random number generated by the first device, when the signed group element $g^a$ is verified, and transmit the signed group elements $(g^a \| g^b)$ and a group element $g^b$ to the first device; the first device is configured to: verify the signed group elements $(g^a \| g^b)$ using the verification function associated with the self-certified Identity Based Signature Scheme and the identity of the second device $id_j$; compute a first shared secret $k_{ij}$ based on the group element a and the group element $g^b$, compute a first key $vk_i$ by providing the first shared secret $k_{ij}$ to a Key Deriving Function, and compute a first authentication data $Ad_i$ by providing the first key $vk_i$ to an Authentication Data Deriving Function, when the signed group elements $(g^a\ g^b)$ are verified; generate the common session key SK by providing the first shared secret $k_{ij}$ to the Key Deriving Function; transmit the first authentication data $Ad_i$ to the second device; upon receiving the first authentication data $Ad_i$, the second device is configured to: compute a second shared secret $k_{ji}$ based on the group element $g^a$ and the group element b, compute a second key $vk_j$ by providing the second shared secret $k_{ji}$ to the Key Deriving Function, compute a second authentication data $Ad_j$ by providing the key $vk_j$ to the Authentication Data Deriving Function, determine if the second authentication data $Ad_j$ matches with the first authentication data $Ad_i$; and generate the common session key SK by providing the second shared secret $k_{ji}$ to the Key Deriving Function, when the second authentication data $Ad_j$ matches with the first authentication data $Ad_i$.

With reference to the fourth aspect, in accordance with embodiments of the application, the generating the first set of parameters for the first device comprises: the first secure server being configured to: retrieve an arbitrary first value $R_{i1}$ and an identity of the first device $id_i$ from the first set of components, wherein the arbitrary first value $R_{i1}$ is generated based on the first random number $r_{i1}$; compute an arbitrary value of the first device $R_i$ and a first integer $s_{i1}$; and set the computed arbitrary value of the first device $R_i$ and the first integer $s_{i1}$ as the parameters for the first device, whereby the arbitrary value of the first device $R_i$ is computed based on the arbitrary first value $R_{i1}$ and the second random number $r_{i2}$; and whereby the first integer $s_{i1}$ is computed based on the second random number $r_{i2}$, the master secret key $x_i$, the arbitrary value of the first device $R_i$, the identity of the first device $id_i$ and a prime number q obtained from the parameters associated with the master public key $mpk_i$.

With reference to the fourth aspect, in accordance with embodiments of the application, the computing the private key $sk_i$ comprises: the first device being configured to: compute an integer $s_i$ based on the first integer $s_{i1}$ as retrieved from the first set of parameters, the first random number $r_{i1}$, and a prime number q as obtained from the parameters associated with the master public key $mpk_i$; and form the private key $sk_i$ based on the arbitrary value of the first device $R_i$ and the integer $s_i$.

With reference to the fourth aspect, in accordance with embodiments of the application, the generating the second set of parameters for the second device comprises: the second secure server being configured to: retrieve an arbitrary first value $R_{j1}$ and an identity of the second device $id_j$ from the second set of components, wherein the arbitrary first value $R_{j1}$ is generated based on the first random number $r_{j1}$; compute an arbitrary value of the second device $R_j$ and a first integer $s_{j1}$; and set the computed arbitrary value of the second device $R_j$ and the first integer $s_{j1}$ as the parameters for the second device, whereby the arbitrary value of the second device $R_j$ is computed based on the arbitrary first value $R_{j1}$ and the second random number $r_{j2}$; and whereby the first integer $s_{j1}$ is computed based on the second random number $r_{j2}$, the master secret key xi, the arbitrary value of the second device $R_j$, the identity of the second device $id_j$ and a prime number q obtained from the parameters associated with the master public key $mpk_j$.

With reference to the fourth aspect, in accordance with embodiments of the application, the computing the private key $sk_j$ comprises: the second device being configured to: compute an integer $s_j$ based on the first integer $s_{j1}$ as retrieved from the second set of parameters, the first random number $r_{j1}$, and a prime number q as obtained from the parameters associated with the master public key $mpk_j$; and form the private key $sk_j$ based on the arbitrary value of the second device $R_j$ and the integer $s_j$.

According to a fifth aspect of the application, a system for generating a common session key SK for encoding digital communications between a first device i and a second device j that are participating in an extended Transport Layer Security (TLS) protocol or an extended Datagram Transport Layer Security protocol (DTLS) is provided, the system comprising: a secure server configured to instruct: the first device to compute a private key $sk_i$ based on a first set of parameters received from the secure server, and a random number $r_{i1}$ generated by the first device, wherein the first set of parameters is generated by the secure server based on a second random number $r_{i2}$ generated by the secure server, a first set of components comprising the first random number $r_{i1}$, a master secret key x and parameters associated with a master public key mpk, wherein the first set of components is generated by the first device and transmitted to the secure server, and the second device to compute a private key $sk_j$ based on a second set of parameters received from the secure server, and a random number $r_{j1}$ generated by the second device, wherein the second set of parameters is generated by the secure server based on a second random number $r_{j2}$ generated by the secure server, a second set of components comprising the first random number $r_{j1}$, the master secret key x and the parameters associated with a master public key mpk, wherein the second set of components is generated by the second device and transmitted to the secure server; the first and second devices configured to use a self-certified Identity Based Signature Scheme to generate the common session key SK for the TLS protocol or the DTLS protocol between the first device and the second device, wherein an identity of the first device $id_i$ is included in the first device's Certificate message and the identity of the second device $id_j$ is included in the second device's Certificate message; wherein the self-certified Identity Based Signature Scheme are dictated by the $sk_i$ and $sk_j$.

With reference to the fifth aspect, in accordance with embodiments of the application, the generating the first set of parameters for the first device comprises: the secure server being configured to: retrieve an arbitrary first value $R_{i1}$ and the identity of the first device $id_i$ from the first set of components, wherein the arbitrary first value $R_{i1}$ is generated based on the first random number $r_{i1}$; compute an arbitrary value of the first device $R_i$ and a first integer $s_{i1}$; and set the computed arbitrary value of the first device $R_i$ and the first integer $s_{i1}$ as the parameters for the first device, whereby the arbitrary value of the first device $R_i$ is computed based on the arbitrary first value $R_{i1}$ and the second random number $r_{i2}$; and whereby the first integer $s_{i1}$ is computed based on the second random number $r_{i2}$, the master secret key x, the arbitrary value of the first device $R_i$, the identity of the first device $id_i$ and a prime number q obtained from the parameters associated with the master public key mpk.

With reference to the fifth aspect, in accordance with embodiments of the application, the computing the private key $sk_i$ comprises: the first device being configured to: compute an integer $s_i$ based on the first integer $s_{i1}$ as retrieved from the first set of parameters, the first random number $r_{i1}$, and a prime number q as obtained from the parameters associated with the master public key mpk; and form the private key $sk_i$ based on the arbitrary value of the first device $R_i$ and the integer $s_i$.

With reference to the fifth aspect, in accordance with embodiments of the application, the generating the second set of parameters for the second device comprises: the secure server being configured to: retrieve an arbitrary first value $R_{j1}$ and the identity of the second device $id_j$ from the second set of components, wherein the arbitrary first value $R_{j1}$ is generated based on the first random number $r_{j1}$; compute an arbitrary value of the second device $R_j$ and a first integer $s_{j1}$; and set the computed arbitrary value of the second device $R_j$ and the first integer $s_{j1}$ as the parameters for the second device, whereby the arbitrary value of the second device $R_j$ is computed based on the arbitrary first value $R_{j1}$ and the second random number $r_{j2}$; and whereby the first integer $s_{j1}$ is computed based on the second random number $r_{j2}$, the master secret key x, the arbitrary value of the second device $R_j$, the identity of the second device $id_j$ and a prime number q obtained from the parameters associated with the master public key mpk.

With reference to the fifth aspect, in accordance with embodiments of the application, the computing the private key $sk_j$ comprises: the second device being configured to: compute an integer $s_j$ based on the first integer $s_{j1}$ as retrieved from the second set of parameters, the first random number $r_{j1}$, and a prime number q as obtained from the parameters associated with the master public key mpk.; and form the private key $sk_j$ based on the arbitrary value of the second device $R_j$ and the integer $s_j$.

According to a sixth aspect of the application, a system for generating a common session key SK for encoding digital communications between a first device i and a second device j that are participating in an extended Transport Layer Security (TLS) protocol or an extended Datagram Transport Layer Security protocol (DTLS) is provided, the system comprising: a first secure server configured to instruct: the first device to compute a private key $sk_i$ based on a first set of parameters received from the first secure server, and a random number $r_{i1}$ generated by the first device, wherein the first set of parameters is generated by the first secure server based on a second random number $r_{i2}$ generated by the first secure server, a first set of components comprising the first random number $r_{i1}$, a master secret key x, and parameters associated with a master public key mpki, wherein the first set of components is generated by the first device and transmitted to the first secure server, a second secure server configured to instruct: the second device to compute a private key $sk_j$ based on a second set of parameters received from the second secure server, and a random number $r_{j1}$ generated by the second device, wherein the second set of parameters is generated by the second secure server based on a second random number $r_{j2}$ generated by the second secure server, a second set of components comprising the first random number $r_{j1}$, the master secret key $x_j$ and the parameters associated with a master public key $mpk_j$, wherein the second set of components is generated by the second device and transmitted to the second secure server, wherein the first secure server is located in a different domain from the second secure server; the first and second devices configured to use a self-certified Identity Based Signature Scheme to generate the common session key $SK_{ij}$ for the TLS protocol between the first device and the second device, wherein an identity of the first device $id_i$ is included in the first device's Certificate message and the identity of the second device $id_j$ is included in the second device's Certificate message; wherein the self-certified Identity Based Signature Scheme are dictated by the $sk_i$ and $sk_j$.

With reference to the sixth aspect, in accordance with embodiments of the application, the generating the first set of parameters for the first device comprises: the first secure server being configured to: retrieve an arbitrary first value $R_{i1}$ and the identity of the first device $id_i$ from the first set of components, wherein the arbitrary first value $R_{i1}$ is generated based on the first random number $r_{i1}$; compute an arbitrary value of the first device $R_i$ and a first integer $s_{i1}$; and set the computed arbitrary value of the first device $R_i$ and the first integer $s_{i1}$ as the parameters for the first device, whereby the arbitrary value of the first device $R_i$ is computed based on the arbitrary first value $R_{i1}$ and the second random number $r_{i2}$; and whereby the first integer $s_{i1}$ is computed based on the second random number $r_{i2}$, the master secret key $x_i$, the arbitrary value of the first device $R_i$, the identity of the first device $id_i$ and a prime number q obtained from the parameters associated with the master public key $mpk_i$.

With reference to the sixth aspect, in accordance with embodiments of the application, the computing the private key $sk_i$ comprises: the first device being configured to: compute an integer $s_i$ based on the first integer $s_{i1}$ as retrieved from the first set of parameters, the first random number $r_{i1}$, and a prime number q as obtained from the parameters associated with the master public key $mpk_i$; and form the private key $sk_i$ based on the arbitrary value of the first device $R_i$ and the integer $s_i$.

With reference to the sixth aspect, in accordance with embodiments of the application, the generating the second set of parameters for the second device comprises: the second secure server being configured to: retrieve an arbitrary first value $R_{j1}$ and the identity of the second device $id_j$ from the second set of components, wherein the arbitrary first value $R_{j1}$ is generated based on the first random number $r_{j1}$; compute an arbitrary value of the second device $R_j$ and a first integer $s_{j1}$; and set the computed arbitrary value of the second device $R_j$ and the first integer $s_{j1}$ as the parameters for the second device, whereby the arbitrary value of the second device $R_j$ is computed based on the arbitrary first value $R_{j1}$ and the second random number $r_{j2}$; and whereby the first integer $s_{j1}$ is computed based on the second random number $r_{j2}$, the master secret key $x_j$, the arbitrary value of the second device $R_j$, the identity of the second device $id_j$ and a prime number q obtained from the parameters associated with the master public key $mpk_j$.

With reference to the sixth aspect, in accordance with embodiments of the application, the computing the private key $sk_j$ comprises: the second device being configured to: compute an integer $s_j$ based on the first integer $s_{j1}$ as retrieved from the second set of parameters, the first random number $r_{j1}$, and a prime number q as obtained from the parameters associated with the master public key $mpk_j$; and form the private key $sk_j$ based on the arbitrary value of the second device $R_j$ and the integer $s_j$.

With reference to the sixth aspect, in accordance with embodiments of the application, before the secure server is configured to compute parameters for the device based on the second random number $r_{i2}$ generated by the secure server, the secure server is configured to: receive a zero-knowledge proof result from the device, whereby the zero-knowledge proof result is generated by the device using the first random number $r_{i1}$ and a system parameter k; determine from the zero-knowledge proof result if the first random number $r_{i1}$ is equal or less than the system parameter $\lambda$; and compute parameters for the device based on the second random number $r_{i2}$ generated by the secure server, when the first random number $r_{i1}$ is equal or less than the system parameter $\lambda$.

According to a seventh aspect of the application, a system for generating a common session key SK for encoding digital communications between a first device i and a second device j that are participating in an extended Transport Layer Security (TLS) protocol or an extended Datagram Transport Layer Security protocol (DTLS) is provided, the system comprising: a secure server configured to: generate a private key $sk_i$ for the first device based on an identity of the first device $id_i$ and generate a private key $sk_j$ for the second device based on an identity of the second device $id_j$, using a self-certified Identity Based Signature Scheme; and transmit the private key $sk_i$ to the first device and transmit the private key $sk_j$ to the second device; the first and second devices configured to use the same self-certified Identity Based Signature Scheme to generate the common session key SK for the TLS protocol or the DTLS protocol between the first device and the second device, wherein the identity of the first device $id_i$ is included in the Certificate message of the first device and the identity of the second device $id_j$ is included in the Certificate message of the second device; wherein the self-certified Identity Based Signature Scheme are dictated by the $sk_i$ and $sk_j$.

According to an eighth aspect of the application, a system for generating a common session key SK for encoding digital communications between a first device i and a second device j that are participating in an extended Transport Layer Security (TLS) protocol or an extended Datagram Transport Layer Security protocol (DTLS) is provided, the system comprising: a first secure server configured to: generate a private key $sk_i$ for the first device based on an identity of the first device $id_i$ using a self-certified Identity Based Signature Scheme, and transmit the private key $sk_i$ to the first device; a second secure server configured to: generate a private key $sk_j$ for the second device based on an identity of the second device $id_j$, using a self-certified Identity Based Signature Scheme, and transmit the private key $sk_j$ to the second device; wherein the first secure server is located in a different domain from the second secure server, the first and second devices configured to use the same self-certified Identity Based Signature Scheme with different parameters or different self-certified Identity Based Signature Schemes to generate the common session key SK for the TLS or DTLS protocol between the first device and the second device, wherein the identity of the first device $id_i$ is included in the Certificate message of the first device and the identity of the second device $id_j$ is included in the Certificate message of the second device; wherein the self-certified Identity Based Signature Scheme are dictated by $sk_i$ and $sk_j$.

According to a ninth aspect of the application, a secure server configured to compute a private key sk for a device participating in a self-certified identity based signature system comprising: a processor; and a non-transitory media readable by the processor, the media storing instructions that when executed by the processor, cause the processor to: compute parameters for the device based on a second random number $r_{i2}$ generated by the secure server, a first set of components received from the device, a master secret key x and parameters associated with a master public key mpk, wherein the first set of components comprises a first random number $r_{i1}$ generated by the device, transmit the computed parameters to the device such that the device is configured to compute the private key sk based on the received computed parameters and the random number $r_{i1}$.

With reference to the ninth aspect, in accordance with embodiments of the application, the instructions to compute the parameters for the device comprises: instructions for directing the processor to: retrieve an arbitrary first value $R_{i1}$ and an identity of the device $id_i$ from the first set of components, wherein the arbitrary first value $R_{i1}$ is generated based on the first random number $r_{i1}$; compute an arbitrary value of the device $R_i$ and a first integer $s_{i1}$; and set the computed arbitrary value of the device $R_i$ and the first integer $s_{i1}$ as the parameters for the device, whereby the arbitrary value of the device $R_i$ is computed based on the arbitrary first value $R_{i1}$ and the second random number $r_{i2}$; and whereby the first integer $s_{i1}$ is computed based on the second random number $r_{i2}$, the master secret key x, the arbitrary value of the first device $R_i$, the identity of the device $id_i$ and a prime number q obtained from the parameters associated with the master public key mpk.

With reference to the ninth aspect, in accordance with embodiments of the application, the instructions to compute the parameters for the device comprises: instructions for directing the processor to: retrieve an arbitrary first value $R_{i1}$, an identity of the device $id_i$ and a homomorphic encryption value c from the first set of components, wherein the arbitrary first value $R_{i1}$ is generated based on the first random number $r_{i1}$ and the homomorphic encryption value c is generated by providing the first random number $r_{i1}$ and a prime number q obtained from the parameters associated with the master public key mpk to an additive homomorphic encryption function HEnc( ); set an arbitrary value of the device $R_i$ and a first integer $s_{i1}$ as the parameters for the device, whereby the arbitrary value of the device $R_i$ is computed based on the arbitrary first value $R_{i1}$ and the second random number $r_{i2}$; and whereby the first integer $s_{i1}$ is computed by providing the second random number $r_{i2}$, the homomorphic encryption value c, the master secret key x, the arbitrary value of the first device $R_i$, the identity of the device $id_i$ and the prime number q to the additive homomorphic encryption function HEnc( ).

With reference to the ninth aspect, in accordance with embodiments of the application, before the instructions to compute parameters for the device based on the second random number $r_{i2}$ generated by the secure server, the secure server comprises: instructions for directing the processor to: receive a zero-knowledge proof result from the device, whereby the zero-knowledge proof result is generated by the device using the first random number $r_{i1}$ and a system parameter $\lambda$; determine from the zero-knowledge proof result if the first random number $r_{i1}$ is equal or less than the system parameter $\lambda$; and compute parameters for the device based on the second random number $r_{i2}$ generated by the secure server, when the first random number $r_{i1}$ is equal or less than the system parameter $\lambda$.

According to a tenth aspect of the application, a method for computing a private key sk for a device participating in a self-certified identity based signature system comprises:

computing, by a secure server, parameters for the device based on a second random number $r_{j2}$ generated by the secure server, a first set of components received from the device, a master secret key x and parameters associated with a master public key mpk, wherein the first set of components comprises a first random number $r_{i1}$ generated by the device, transmitting the computed parameters to the device such that the device computes the private key sk based on the received computed parameters and the random number $r_{i1}$.

With reference to the tenth aspect, in accordance with embodiments of the application, the computing the parameters for the device comprises: retrieving, by the secure server, an arbitrary first value $R_{i1}$ and an identity of the device $id_i$ from the first set of components, wherein the arbitrary first value $R_{i1}$ is generated based on the first random number $r_{i1}$; computing an arbitrary value of the device $R_i$ and a first integer $s_{i1}$; and setting the computed arbitrary value of the device $R_i$ and the first integer $s_i$ as the parameters for the device, whereby the arbitrary value of the device $R_i$ is computed based on the arbitrary first value $R_i$ and the second random number $r_{i2}$; and whereby the first integer $s_{i1}$ is computed based on the second random number $r_{i2}$, the master secret key x, the arbitrary value of the first device $R_i$, the identity of the device $id_i$ and a prime number q obtained from the parameters associated with the master public key mpk.

With reference to the tenth aspect, in accordance with embodiments of the application, the computing the parameters for the device comprises: retrieving, by the secure server, an arbitrary first value $R_{i1}$, an identity of the device $id_i$ and a homomorphic encryption value c from the first set of components, wherein the arbitrary first value $R_{i1}$ is generated based on the first random number $r_{i1}$ and the homomorphic encryption value c is generated by providing the first random number $r_{i1}$ and a prime number q obtained from the parameters associated with the master public key mpk to an additive homomorphic encryption function HEnc( ); setting an arbitrary value of the device $R_i$ and a first integer $s_{i1}$ as the parameters for the device, whereby the arbitrary value of the device $R_i$ is computed based on the arbitrary first value $R_{i1}$ and the second random number $r_{i2}$; and whereby the first integer $s_{i1}$ is computed by providing the second random number $r_{i2}$, the homomorphic encryption value c, the master secret key x, the arbitrary value of the first device $R_i$, the identity of the device $id_i$ and the prime number q to the additive homomorphic encryption function HEnc( ).

According to an eleventh aspect of the application, a method for generating a common session key SK for encoding digital communications between a first device i and a second device j that are participating in a self-certified identity based signature scheme comprises: receiving, by the first device, instructions from a secure server to compute a private key $sk_i$ based on a first set of parameters received from the secure server, and a random number $r_{i1}$ generated by the first device, wherein the first set of parameters is generated by the secure server based on a second random number $r_{i2}$ generated by the secure server, a first set of components comprising the first random number $r_{i1}$, a master secret key x and parameters associated with a master public key mpk, wherein the first set of components is generated by the first device and transmitted to the secure server, and signing, by the first device, a group element $g^a$ using a self-certified Identity Based Signature Scheme and the private key $sk_i$, where a is a random number generated by the first device and g is a generator of a cyclic group G; transmitting an identity of the first device $id_i$, the group element $g^a$ and the signed group element $g^a$ to the second.

With reference to the eleventh aspect, in accordance with embodiments of the application, the method further comprises: receiving a signed group elements (ga||gb) and a group element $g^b$ from the second device; verifying the signed group elements $(g^a\|g^b)$ using the verification function associated with the self-certified Identity Based Signature Scheme and the identity of the second device $id_j$; computing a first shared secret $k_{ij}$ based on the group element a and the group element $g^b$, compute a first key $vk_i$ by providing the first shared secret $k_{ij}$ to a Key Deriving Function, and compute a first authentication data $Ad_i$ by providing the first key $vk_i$ to an Authentication Data Deriving Function, when the signed group elements $(g^a\|g^b)$ are verified; generating the common session key SK by providing the first shared secret $k_{ij}$ to the Key Deriving Function; transmitting the first authentication data $Ad_i$ to the second device.

According to a twelfth aspect of the application, a first device for generating a common session key SK for encoding digital communications between the first device and a second device that are participating in a self-certified identity based signature scheme comprises: a processor; and a non-transitory media readable by the processor, the media storing instructions that when executed by the processor, cause the processor to: receive instructions from a secure server to compute a private key $sk_i$ based on a first set of parameters received from the secure server, and a random number $r_{i1}$ generated by the first device, wherein the first set of parameters is generated by the secure server based on a second random number $r_{j2}$ generated by the secure server, a first set of components comprising the first random number $r_{i1}$, a master secret key x and parameters associated with a master public key mpk, wherein the first set of components is generated by the first device and transmitted to the secure server, and sign a group element $g^a$ using a self-certified Identity Based Signature Scheme and the private key $sk_i$, where a is a random number generated by the first device and g is a generator of a cyclic group G; transmit an identity of the first device $id_i$, the group element $g^a$ and the signed group element $g^a$ to the second.

With reference to the twelfth aspect, in accordance with embodiments of the application, the instructions comprise instructions for directing the processor to: receive a signed group elements (ga||gb) and a group element $g^b$ from the second device; verify the signed group elements $(g^a\|g^b)$ using the verification function associated with the self-certified Identity Based Signature Scheme and the identity of the second device $id_j$; compute a first shared secret $k_{ij}$ based on the group element a and the group element $g^b$, compute a first key $vk_i$ by providing the first shared secret $k_{ij}$ to a Key Deriving Function, and compute a first authentication data $Ad_i$ by providing the first key $vk_i$ to an Authentication Data Deriving Function, when the signed group elements $(g^a\|g^b)$ are verified; generate the common session key SK by providing the first shared secret $k_{ij}$ to the Key Deriving Function; transmit the first authentication data $Ad_i$ to the second device.

According to a thirteenth aspect of the application, a method for generating a common session key SK for encoding digital communications between a first device i and a second device j that are participating in a self-certified identity based signature scheme comprises: receiving, by the second device, instructions from the secure server to compute a private key $sk_j$ based on a second set of parameters received from the secure server, and a random number $r_{j1}$ generated by the second device, wherein the second set of parameters is generated by the secure server based on a second random number $r_{j2}$ generated by the secure server, a second set of components comprising the first random number $r_{j1}$, the master secret key x and the parameters associated with a master public key mpk, wherein the second set of components is generated by the second device and transmitted to the secure server; receiving an identity of the first device $id_i$, the group element $g^a$ and the signed group element $g^a$ from the first; verifying the signed group element $g^a$ using a verification function associated with the self-certified Identity Based Signature Scheme and the identity of the first device $id_i$; signing group elements $(g^a\|g^b)$ using the self-certified Identity Based Signature Scheme and the private key $sk_j$, where b is a random number generated by the first device, when the signed group element g a is verified; and transmitting the signed group elements $(g^a\|g^b)$ and a group element $g^b$ to the first device.

With reference to the thirteenth aspect, in accordance with embodiments of the application, the method further comprises: receiving a first authentication data $Ad_i$ from the first device; computing a second shared secret $k_{ji}$ based on the group element $g^a$ and the group element $g^b$; computing a second key $vk_j$ by providing the second shared secret $k_{ji}$ to the Key Deriving Function; computing a second authentication data $Ad_j$ by providing the key $vk_j$ to the Authentication Data Deriving Function; determining if the second authentication data $Ad_j$ matches with the first authentication data $Ad_i$; and generating the common session key SK by providing the second shared secret $k_{ji}$ to the Key Deriving Function, when the second authentication data $Ad_j$ matches with the first authentication data $Ad_i$.

According to a fourteenth aspect of the application, a second device for generating a common session key SK for encoding digital communications between a first device and the second device that are participating in a self-certified identity based signature scheme comprises: a processor; and a non-transitory media readable by the processor, the media storing instructions that when executed by the processor, cause the processor to: receive instructions from the secure server to compute a private key $sk_j$ based on a second set of parameters received from the secure server, and a random number $r_{j1}$ generated by the second device, wherein the second set of parameters is generated by the secure server based on a second random number $r_{j2}$ generated by the secure server, a second set of components comprising the first random number $r_{j1}$, the master secret key x and the parameters associated with a master public key mpk, wherein the second set of components is generated by the second device and transmitted to the secure server; receive an identity of the first device $id_i$, the group element $g^a$ and the signed group element $g^a$ from the first; verify the signed group element $g^a$ using a verification function associated with the self-certified Identity Based Signature Scheme and the identity of the first device $id_i$; sign group elements $(g^a\|g^b)$ using the self-certified Identity Based Signature Scheme and the private key $sk_j$, where b is a random number generated by the first device, when the signed group element $g^a$ is verified; and transmit the signed group elements $(g^a\|g^b)$ and a group element $g^b$ to the first device.

With reference to the fourteenth aspect, in accordance with embodiments of the application, the instructions comprise instructions for directing the processor to: receive a first authentication data $Ad_i$ from the first device; compute a second shared secret $k_{ji}$ based on the group element $g^a$ and the group element $g^b$; compute a second key $vk_j$ by providing the second shared secret $k_{ji}$ to the Key Deriving Function; compute a second authentication data $Ad_j$ by providing the key $vk_j$ to the Authentication Data Deriving Function; determine if the second authentication data $Ad_j$ matches with the first authentication data $Ad_i$; and generate the common session key SK by providing the second shared secret $k_{ji}$ to the Key Deriving Function, when the second authentication data $Ad_j$ matches with the first authentication data $Ad_i$.

According to a fifteenth aspect of the application, a method for generating a common session key SK for encoding digital communications between a first device i and a second device j participating in a self-certified identity based signature scheme comprises: receiving, by the first device, instructions from a secure server, to compute a private key $sk_i$ based on a first set of parameters received from the secure server, and a random number $r_{i1}$ generated by the first device, wherein the first set of parameters is generated by the secure server based on a second random number $r_{i2}$ generated by the secure server, a first set of components comprising the first random number $r_{i1}$, a master secret key x and parameters associated with a master public key mpk, wherein the first set of components is generated by the first device and transmitted to the secure server, and signing, by the first device, a cryptographic nonce $N_i$ using a self-certified Identity Based Signature Scheme and the private key $sk_i$; transmitting an identity of the first device $id_i$, the cryptographic nonce $N_i$ and the signed cryptographic nonce $N_i$ to the second device. such that, upon receiving the transmission, the second device is configured to: verifying the signed cryptographic nonce $N_i$ using a verification function associated with the self-certified Identity Based Signature Scheme and the identity of the first device $id_i$; signing cryptographic nonces $(N_i\|N_j)$ using the self-certified Identity Based Signature Scheme and the private key $sk_j$, where $N_j$ is a cryptographic nonce, when the signed cryptographic nonce $N_i$ is verified; and transmitting the signed cryptographic nonces $(N_i\|N_j)$ and the cryptographic nonce $N_j$ to the first device.

With reference to the fifteenth aspect, in accordance with embodiments of the application, the method further comprises: receiving a cryptographic nonces $(N_i\|N_j)$ and the cryptographic nonce $N_j$ from the second device; verifying the signed cryptographic nonces $(N_i\|N_j)$ using the verification function associated with the self-certified Identity Based Signature Scheme and the identity of the second device $id_j$, compute a first shared secret $k_{ij}=g^{sj\cdot si}$, compute a first key $vk_i$ by providing the first shared secret $k_{ij}$ to a Key Deriving Function, and compute a first authentication data $Ad_i$ by providing the cryptographic nonces $N_i$ and $N_j$ and the first key $vk_i$ to an Authentication Data Deriving Function, when the signed cryptographic nonces $(N_i\|N_j)$ are verified; generating the common session key SK by providing the first shared secret $k_{ij}$ and the cryptographic nonces $N_i$ and $N_j$ to the Key Deriving Function; transmitting the first authentication data $Ad_i$ to the second device.

According to a sixteenth aspect of the application, a first device for generating a common session key SK for encoding digital communications between a first device i and a second device j participating in a self-certified identity based signature scheme comprises: a processor; and a non-transitory media readable by the processor, the media storing instructions that when executed by the processor, cause the processor to: receive instructions from a secure server, to compute a private key $sk_i$ based on a first set of parameters received from the secure server, and a random number $r_{i1}$ generated by the first device, wherein the first set of parameters is generated by the secure server based on a second random number $r_{i2}$ generated by the secure server, a first set of components comprising the first random number $r_{i1}$, a master secret key x and parameters associated with a master public key mpk, wherein the first set of components is generated by the first device and transmitted to the secure server; and sign a cryptographic nonce $N_i$ using a self-certified Identity Based Signature Scheme and the private key $sk_i$; and transmit an identity of the first device $id_i$, the cryptographic nonce $N_i$ and the signed cryptographic nonce $N_i$ to the second device.

With reference to the sixteenth aspect, in accordance with embodiments of the application, the instructions comprise instructions for directing the processor to: receive a cryptographic nonces $(N_i \| N_j)$ and the cryptographic nonce $N_j$ from the second device; verify the signed cryptographic nonces $(N_i \| N_j)$ using the verification function associated with the self-certified Identity Based Signature Scheme and the identity of the second device $id_j$, compute a first shared secret $k_{ij} = g^{sj \cdot si}$, compute a first key $vk_i$ by providing the first shared secret $k_{ij}$ to a Key Deriving Function, and compute a first authentication data $Ad_i$ by providing the cryptographic nonces $N_i$ and $N_j$ and the first key $vk_i$ to an Authentication Data Deriving Function, when the signed cryptographic nonces $(N_i \| N_j)$ are verified; generate the common session key SK by providing the first shared secret $k_{ij}$ and the cryptographic nonces $N_i$ and $N_j$ to the Key Deriving Function; and transmit the first authentication data $Ad_i$ to the second device.

According to a seventeenth aspect of the application, a second device for generating a common session key SK for encoding digital communications between a first device and the second device participating in a self-certified identity based signature scheme comprises: a processor; and a non-transitory media readable by the processor, the media storing instructions that when executed by the processor, cause the processor to: receive instructions from the secure server to compute a private key $sk_j$ based on a second set of parameters received from the secure server, and a random number $r_{j1}$ generated by the second device, wherein the second set of parameters is generated by the secure server based on a second random number $r_{j2}$ generated by the secure server, a second set of components comprising the first random number $r_{j1}$, the master secret key x and the parameters associated with a master public key mpk, wherein the second set of components is generated by the second device and transmitted to the secure server; receive an identity of the first device $id_i$, the cryptographic nonce $N_i$ and the signed cryptographic nonce $N_i$ from the first device; verify the signed cryptographic nonce $N_i$ using a verification function associated with the self-certified Identity Based Signature Scheme and the identity of the first device $id_i$; sign cryptographic nonces $(N_i \| N_j)$ using the self-certified Identity Based Signature Scheme and the private key $sk_j$, where $N_j$ is a cryptographic nonce, when the signed cryptographic nonce $N_i$ is verified; and transmit the signed cryptographic nonces $(N_i \| N_j)$ and the cryptographic nonce $N_j$ to the first device.

With reference to the seventeenth aspect, in accordance with embodiments of the application, the instructions comprise instructions for directing the processor to: receive a first authentication data $Ad_i$ from the first device; compute a second shared secret $k_{ji} = g_{sj} \cdot s_i$; compute a second key $vk_j$ by providing the second shared secret $k_{ji}$ to the Key Deriving Function; compute a second authentication data $Ad_j$ by providing the key $vk_j$ and the cryptographic nonces $N_i$ and $N_j$ to the Authentication Data Deriving Function; determine if the second authentication data $Ad_j$ matches with the first authentication data $Ad_i$; and generate the common session key SK by providing the second shared secret $k_{ji}$ to the Key Deriving Function, when the second authentication data $Ad_j$ matches with the first authentication data $Ad_i$.

According to an eighteenth aspect of the application, a method for generating a common session key SK for encoding digital communications between a first device i and a second device j that are participating in a self-certified identity based signature scheme, the method comprises: receiving, by the first device instructions from a first secure server to compute a private key $sk_i$ based on a first set of parameters received from the first secure server, and a random number $r_{i1}$ generated by the first device, wherein the first set of parameters is generated by the first secure server based on a second random number $r_{i2}$ generated by the first secure server, a first set of components comprising the first random number $r_{i1}$, a master secret key x, and parameters associated with a master public key mpki, wherein the first set of components is generated by the first device and transmitted to the first secure server; wherein the first secure server is located in a different domain from the second secure server; signing, by the first device, a group element $g^a$ using a self-certified Identity Based Signature Scheme and the private key $sk_i$, where a is a random number generated by the first device and g is a generator of a cyclic group G; transmitting an identity of the first device $id_i$, the group element $g^a$ and the signed group element $g^a$ to the second device.

With reference to the eighteenth aspect, in accordance with embodiments of the application, the method further comprises: receiving a signed group elements $(g^a \| g^b)$ and a group element $g^b$ from the second device; verifying the signed group elements $(g^a \| g^b)$ using the verification function associated with the self-certified Identity Based Signature Scheme and the identity of the second device $id_j$; computing a first shared secret $k_{ij}$ based on the group element a and the group element $g^b$, compute a first key $vk_i$ by providing the first shared secret $k_{ij}$ to a Key Deriving Function, and compute a first authentication data $Ad_i$ by providing the first key $vk_i$ to an Authentication Data Deriving Function, when the signed group elements $(g^a \| g^b)$ are verified; generating the common session key SK by providing the first shared secret $k_{ij}$ to the Key Deriving Function; and transmitting the first authentication data $Ad_i$ to the second device.

According to a nineteenth aspect of the application, a first device for generating a common session key SK for encoding digital communications between the first device and a second device that are participating in a self-certified identity based signature scheme, the first device comprises: a processor; and a non-transitory media readable by the processor, the media storing instructions that when executed by the processor, cause the processor to: receive instructions from a first secure server to compute a private key $sk_i$ based on a first set of parameters received from the first secure server, and a random number $r_{i1}$ generated by the first device, wherein the first set of parameters is generated by the first secure server based on a second random number $r_{i2}$ generated by the first secure server, a first set of components comprising the first random number $r_{i1}$, a master secret key x, and parameters associated with a master public key $mpk_i$, wherein the first set of components is generated by the first device and transmitted to the first secure server; wherein the first secure server is located in a different domain from the second secure server; sign, by the first device, a group element $g^a$ using a self-certified Identity Based Signature Scheme and the private key $sk_i$, where a is a random number generated by the first device and g is a generator of a cyclic group G; and transmit an identity of the first device $id_i$, the group element $g^a$ and the signed group element $g^a$ to the second device.

With reference to the nineteenth aspect, in accordance with embodiments of the application, the instructions comprise instructions for directing the processor to: receive a signed group elements ($g^a \| g^b$) and a group element $g^b$ from the second device; verify the signed group elements ($g^a \| g^b$) using the verification function associated with the self-certified Identity Based Signature Scheme and the identity of the second device $id_j$; compute a first shared secret $k_{ij}$ based on the group element a and the group element $g^b$, compute a first key $vk_i$ by providing the first shared secret $k_{ij}$ to a Key Deriving Function, and compute a first authentication data $Ad_i$ by providing the first key $vk_i$ to an Authentication Data Deriving Function, when the signed group elements ($g^a \| g^b$) are verified; generate the common session key SK by providing the first shared secret $k_{ij}$ to the Key Deriving Function; and transmit the first authentication data $Ad_i$ to the second device.

According to a twentieth aspect of the application, a method for generating a common session key SK for encoding digital communications between a first device i and a second device j that are participating in a self-certified identity based signature scheme, the method comprises: receiving, by the second device instructions from a second secure server to compute a private key $sk_j$ based on a second set of parameters received from the second secure server, and a random number $r_{j1}$ generated by the second device, wherein the second set of parameters is generated by the second secure server based on a second random number $r_{j2}$ generated by the second secure server, a second set of components comprising the first random number $r_{j1}$, a master secret key $x_j$ and the parameters associated with a master public key $mpk_j$, wherein the second set of components is generated by the second device and transmitted to the second secure server; receiving an identity of the first device $id_i$, the group element $g^a$ and the signed group element $g^a$ to the second device; verifying the signed group element $g^a$ using a verification function associated with the self-certified Identity Based Signature Scheme and the identity of the first device $id_i$, signing group elements ($g^a \| g^b$) using the self-certified Identity Based Signature Scheme and the private key $sk_j$, where b is a random number generated by the first device, when the signed group element $g^a$ is verified, and transmitting the signed group elements ($g^a \| g^b$) and a group element $g^b$ to the first device.

With reference to the twentieth aspect, in accordance with embodiments of the application, the method further comprises: receiving a first authentication data $Ad_i$ to from the first device; computing a second shared secret $k_{ji}$ based on the group element $g^a$ and the group element b, computing a second key $vk_j$ by providing the second shared secret $k_{ji}$ to the Key Deriving Function, computing a second authentication data $Ad_j$ by providing the key $vk_j$ to the Authentication Data Deriving Function, determining if the second authentication data $Ad_j$ matches with the first authentication data $Ad_i$; and generating the common session key SK by providing the second shared secret $k_{ji}$ to the Key Deriving Function, when the second authentication data $Ad_j$ matches with the first authentication data $Ad_i$.

According to a twenty-first aspect of the application, a second device for generating a common session key SK for encoding digital communications between a first device and the second device that are participating in a self-certified identity based signature scheme, the second device comprises: a processor; and a non-transitory media readable by the processor, the media storing instructions that when executed by the processor, cause the processor to: receive instructions from a second secure server to compute a private key $sk_j$ based on a second set of parameters received from the second secure server, and a random number $r_{j1}$ generated by the second device, wherein the second set of parameters is generated by the second secure server based on a second random number $r_{j2}$ generated by the second secure server, a second set of components comprising the first random number $r_{j1}$, a master secret key $x_j$ and the parameters associated with a master public key $mpk_j$, wherein the second set of components is generated by the second device and transmitted to the second secure server; receive an identity of the first device $id_i$, the group element $g^a$ and the signed group element $g^a$ to the second device; verify the signed group element $g^a$ using a verification function associated with the self-certified Identity Based Signature Scheme and the identity of the first device $id_i$, sign group elements ($g^a \| g^b$) using the self-certified Identity Based Signature Scheme and the private key $sk_j$, where b is a random number generated by the first device, when the signed group element $g^a$ is verified, and transmit the signed group elements ($g^a \| g^b$) and a group element $g^b$ to the first device.

With reference to the twenty-first aspect, in accordance with embodiments of the application, the instructions comprise instructions for directing the processor to: receive a first authentication data $Ad_i$ from the first device; compute a second shared secret $k_{ji}$ based on the group element $g^a$ and the group element $g^b$, compute a second key $vk_j$ by providing the second shared secret $k_{ji}$ to the Key Deriving Function, compute a second authentication data $Ad_j$ by providing the key $vk_j$ to the Authentication Data Deriving Function, determine if the second authentication data $Ad_j$ matches with the first authentication data $Ad_i$; and generate the common session key SK by providing the second shared secret $k_{ji}$ to the Key Deriving Function, when the second authentication data $Ad_j$ matches with the first authentication data $Ad_i$.

According to a twenty-second aspect of the application, a method for generating a common session key SK for encoding digital communications between a first device i and a second device j that are participating in an extended Transport Layer Security (TLS) protocol or an extended Datagram Transport Layer Security protocol (DTLS), the method comprises: receiving, by the first device instructions from a secure server to compute a private key $sk_i$ based on a first set of parameters received from the secure server, and a random number $r_{i1}$ generated by the first device, wherein the first set of parameters is generated by the secure server based on a second random number $r_{i2}$ generated by the secure server, a first set of components comprising the first random number $r_{i1}$, a master secret key x and parameters associated with a master public key mpk, wherein the first set of components is generated by the first device and transmitted to the secure server; and communicating, by the first device, with the second device to generate the common session key SK for the TLS protocol or the DTLS protocol by using a self-certified Identity Based Signature Scheme, wherein an identity of the first device $id_i$ is included in the first device's Certificate message and the identity of the second device $id_j$ is included in the second device's Certificate message; wherein the self-certified Identity Based Signature Scheme are dictated by a $sk_j$ and the $sk_i$; wherein the $sk_j$ is a private key computed by the second device.

According to a twenty-third aspect of the application, a first device for generating a common session key SK for encoding digital communications between the first device i and a second device j that are participating in an extended Transport Layer Security (TLS) protocol or an extended Datagram Transport Layer Security protocol (DTLS), the first device comprises: a processor; and a non-transitory media readable by the processor, the media storing instructions that when executed by the processor, cause the processor to: receive instructions from a secure server to compute a private key $sk_i$ based on a first set of parameters received from the secure server, and a random number $r_{i1}$ generated by the first device, wherein the first set of parameters is generated by the secure server based on a second random number $r_{i2}$ generated by the secure server, a first set of components comprising the first random number $r_{i1}$, a master secret key x and parameters associated with a master public key mpk, wherein the first set of components is generated by the first device and transmitted to the secure server; and communicate with the second device to generate the common session key SK for the TLS protocol or the DTLS protocol by using a self-certified Identity Based Signature Scheme, wherein an identity of the first device $id_i$ is included in the first device's Certificate message and the identity of the second device $id_j$ is included in the second device's Certificate message; wherein the self-certified Identity Based Signature Scheme are dictated by a $sk_j$ and the $sk_i$; wherein the $sk_j$ is a private key computed by the second device.

According to a twenty-fourth aspect of the application, a method for generating a common session key SK for encoding digital communications between a first device i and a second device j that are participating in an extended Transport Layer Security (TLS) protocol or an extended Datagram Transport Layer Security protocol (DTLS), the method comprises: generating, by a secure server, a private key $sk_i$ for the first device based on an identity of the first device $id_i$ and generate a private key $sk_j$ for the second device based on an identity of the second device $id_j$, using a self-certified Identity Based Signature Scheme; and transmitting the private key $sk_i$ to the first device and transmit the private key $sk_j$ to the second device such that the first and second devices are configured to use the same self-certified Identity Based Signature Scheme to generate the common session key SK for the TLS protocol or the DTLS protocol between the first device and the second device, wherein the identity of the first device $id_i$ is included in the Certificate message of the first device and the identity of the second device $id_j$ is included in the Certificate message of the second device; wherein the self-certified Identity Based Signature Scheme are dictated by the $sk_j$ and the $sk_i$.

According to a twenty-fifth aspect of the application, a secure server for generating a common session key SK for encoding digital communications between a first device i and a second device j that are participating in an extended Transport Layer Security (TLS) protocol or an extended Datagram Transport Layer Security protocol (DTLS), the secure server comprises: a processor; and a non-transitory media readable by the processor, the media storing instructions that when executed by the processor, cause the processor to: generate a private key $sk_i$ for the first device based on an identity of the first device $id_i$ and generate a private key $sk_j$ for the second device based on an identity of the second device $id_j$, using a self-certified Identity Based Signature Scheme; and transmit the private key $sk_i$ to the first device and transmit the private key $sk_j$ to the second device such that the first and second devices are configured to use the same self-certified Identity Based Signature Scheme to generate the common session key SK for the TLS protocol or the DTLS protocol between the first device and the second device, wherein the identity of the first device $id_i$ is included in the Certificate message of the first device and the identity of the second device $id_j$ is included in the Certificate message of the second device; wherein the self-certified Identity Based Signature Scheme are dictated by the $sk_j$ and the $sk_i$.

BRIEF DESCRIPTION OF THE DRAWINGS

The above advantages and features in accordance with this application are described in the following detailed description and are shown in the following drawings.

DETAILED DESCRIPTION OF THE EMBODIMENT

This application relates to a system and method for generating private keys for devices participating in a self-certified identity based signature scheme whereby the private key is used by the devices to establish a common session key for encoding digital communications between devices. In particular, the private keys generated in accordance with the system and methods of the application are only known to the devices themselves and not by any other third parties.

Further, before the common session key is calculated, an entity-pair or device-pair will first verify the veracity of each entity or device. Once each of these entities has been authenticated, the entity-pair will then proceed to generate a common session key that is then utilized to encode digital communications between these entities.

Figure 1:
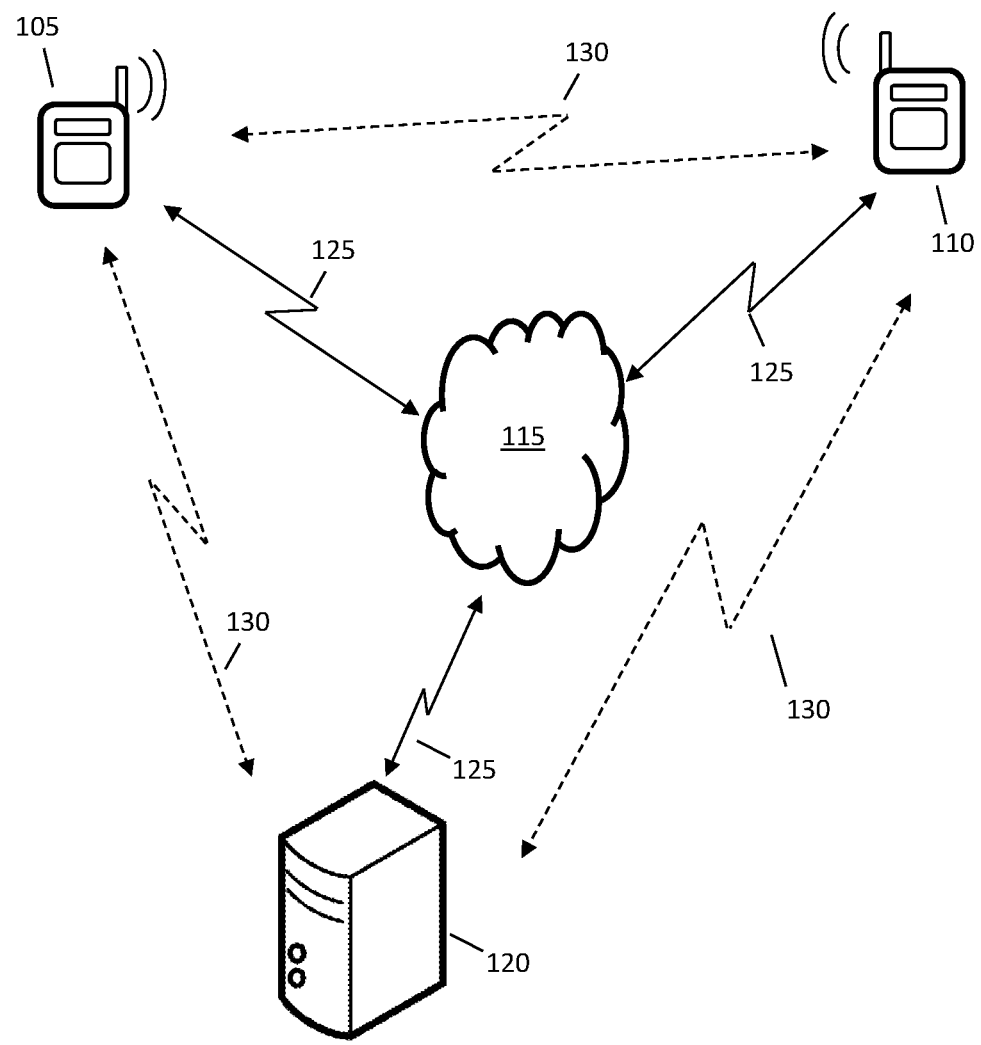
FIG. 1 illustrates a block diagram representative of an entity-pair authentication and a common session key generation system for the authenticated entity-pair in accordance with embodiments of the application.

FIG. 1 illustrates a block diagram of an entity-pair authentication and a common session key generation system in accordance with embodiments of the application. One skilled in the art will recognize that the term entity and device may be used interchangeably throughout the description without departing from the application.

The system illustrated in FIG. 1 comprises devices or entities 105, 110, that are wirelessly connected to secure server 120. Entities 105 and 110 each may comprise, but is not limited to, any device that is able to carry out wireless communicative functions such as a smart phone, a tablet computer, a mobile computer, a netbook, a wearable electronic device such as smart watch, smart plugs, or transceivers that may be found in smart devices or Internet of Things (IoT) enabled devices, and etc.

As for secure server 120, this server may comprise a secure cloud server or a remotely located secure server which is able to communicate wirelessly with entities 105 and 110 either through Internet 115 or directly with entities 105 and 110. If server 120 is configured to communicate with entities 105 and 110 through Internet 115, server 120 may do so via wired networks or wireless networks 125 such as, but are not limited to, cellular networks, satellite networks, telecommunication networks, or Wide Area Networks (WAN). Alternatively, if server 120 is configured to communicate directly with entities 105 and 110, this may be accomplished through wireless networks 130 such as, but not limited to, Wireless-Fidelity (Wi-Fi), Bluetooth, or Near Field Communication (NFC). It should be noted that entities 105 and 110 may utilize either one of wireless network 125 (via the Internet) or wireless network 130 (direct communication) to exchange data messages with one another.

Figure 2:
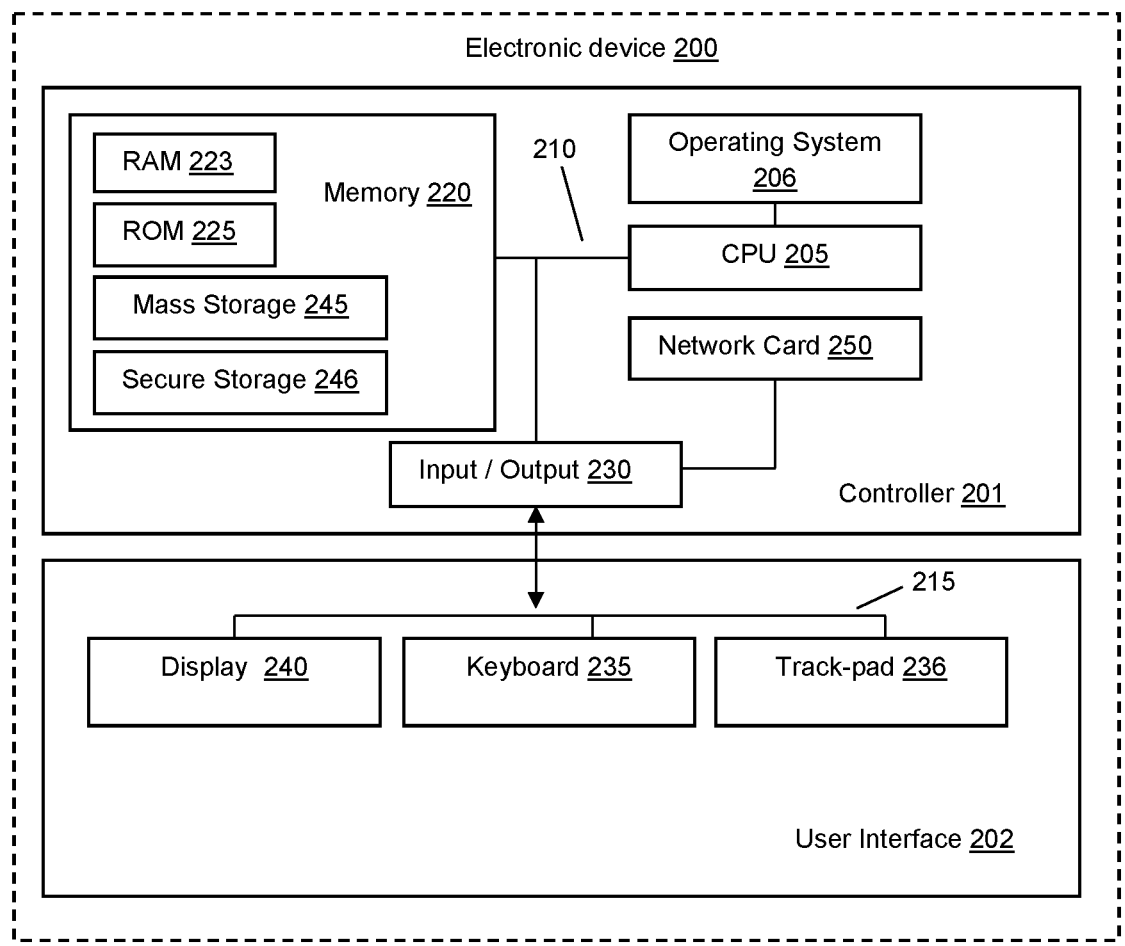
FIG. 2 illustrates a block diagram representative of components in an electronic device or server for implementing embodiments in accordance with embodiments of the application.

FIG. 2 illustrates a block diagram representative of components of an electronic device 200 that is provided within entities 105, 110 and server 120 for implementing embodiments in accordance with embodiments of the application. One skilled in the art will recognize that the exact configuration of each electronic device provided within the entities or the server may be different and the exact configuration of electronic device 200 may vary and FIG. 2 is provided by way of example only.

In embodiments of the application, device 200 comprises controller 201 and user interface 202. User interface 202 is arranged to enable manual interactions between a user and electronic device 200 and for this purpose includes the input/output components for the user to enter instructions to control electronic device 200. A person skilled in the art will recognize that components of user interface 202 may vary from embodiment to embodiment but will typically include one or more of display 240, keyboard 235 and track-pad 236.

Controller 201 is in data communication with user interface 202 via bus 215 and includes memory 220, Central Processing Unit (CPU) 205 mounted on a circuit board that processes instructions and data for performing the method of this embodiment, an operating system 206, an input/output (I/O) interface 230 for communicating with user interface 202 and a communications interface, in this embodiment in the form of a network card 250. Network card 250 may, for example, be utilized to send data from electronic device 200 via a wired or wireless network to other processing devices or to receive data via the wired or wireless network. Wireless networks that may be utilized by network card 250 include, but are not limited to, Wireless-Fidelity (Wi-Fi), Bluetooth, Near Field Communication (NFC), cellular networks, satellite networks, telecommunication networks, Wide Area Networks (WAN) and etc.

Memory 220 and operating system 206 are in data communication with CPU 205 via bus 210. The memory components include both volatile and non-volatile memory and more than one of each type of memory, including Random Access Memory (RAM) 220, Read Only Memory (ROM) 225 and a mass storage device 245, the last comprising one or more solid-state drives (SSDs). Memory 220 also includes secure storage 246 for securely storing secret keys, or private keys. It should be noted that the contents within secure storage 246 are only accessible by a super-user or administrator of device 200 and may not be accessed by any user of device 200. One skilled in the art will recognize that the memory components described above comprise non-transitory computer-readable media and shall be taken to comprise all computer-readable media except for a transitory, propagating signal. Typically, the instructions are stored as program code in the memory components but can also be hardwired. Memory 220 may include a kernel and/or programming modules such as a software application that may be stored in either volatile or non-volatile memory.

Herein the term "CPU" is used to refer generically to any device or component that can process such instructions and may include: a microprocessor, microcontroller, programmable logic device or other computational device. That is, CPU 205 may be provided by any suitable logic circuitry for receiving inputs, processing them in accordance with instructions stored in memory and generating outputs (for example to the memory components or on display 240). In this embodiment, CPU 205 may be a single core or multi-core processor with memory addressable space. In one example, CPU 205 may be multi-core, comprising—for example—an 8 core CPU.

Generation of a Private Key

Referring back to FIG. 1, prior to adding entities 105 and 110 to the entity-pair authentication and the common session key generation system in accordance with embodiments of the application, server 120, which is configured as a Key Generation Centre, will first initiate a setup procedure based on a discrete-logarithm type signature scheme to generate a master secret key "x" and a master public key "y". In the setup procedure, server 120 will first determine an appropriate cyclic group, G, with a prime order q, and a generator g of G. In embodiments of the application, the cyclic group, G, will be based on finite fields or elliptic curves defined over a finite field.

Server 120 will then select a cryptographic collision-resistant hash function H: $\{0,1\}^* \rightarrow \{0,1\}^\iota$, whereby $\iota$ is an appropriate integer known to a person skilled in the art. Server 120 will also select an Authentication Data Deriving Function and a Key Deriving Function that is to be adopted for use in the system. In embodiments of the application, the Authentication Data Deriving Function (AdDF) may include any algorithm or scheme for verifying the authenticity of a message such as a message authentication code (MAC), a message integrity code or a keyed hash function while the Key Deriving Function (KDF) may include any scheme for deriving a secret key from a secret value such as a collision-resistant hash function.

Once that is done, server 120 then proceeds to select the master secret key "x" from an allowed set of integers ($x \in Z_q$), sets $y=g^x$ and the master public key "mpk" is set as mpk=$\{$G, g, q, y, H, AdDF, KDF$\}$.

It should be noted that the setup procedure described above is similar to the initiation procedures for setting up a discrete-logarithmic type of self-certified identity based signature scheme such as, but not limited to, the lightweight identity based signature scheme as defined in ISO/IEC 29192-4 or elliptic curve-based certificate-less signature scheme as defined in IETF RFC 6507. In such self-certified Identity Based Signature Schemes, signatures generated by a particular user always contains a fixed component that is specific to that user's private signing key or private key. Hence, the fixed component is termed key-specific data (KSD) in this application whereby the KSD may be utilized to verify the generated signatures. For illustration purposes, the identity based signature scheme defined in ISO/IEC 29192-4 is adopted in all embodiments below, but for one skilled in the art, the system and method is easily applied to other self-certified identity based signature schemes such as the scheme specified in IETF RFC 6507, with due changes in a straightforward way.

When entity 105 or 110 joins the system, a private key unique to each of these entities will be issued by secure server 120, i.e. the Key Generation Centre. These unique private keys once generated will then be communicated to each of these entities whereby the respective private keys will then be stored in the secure memory within each of entities 105 and 110.

Figure 3:
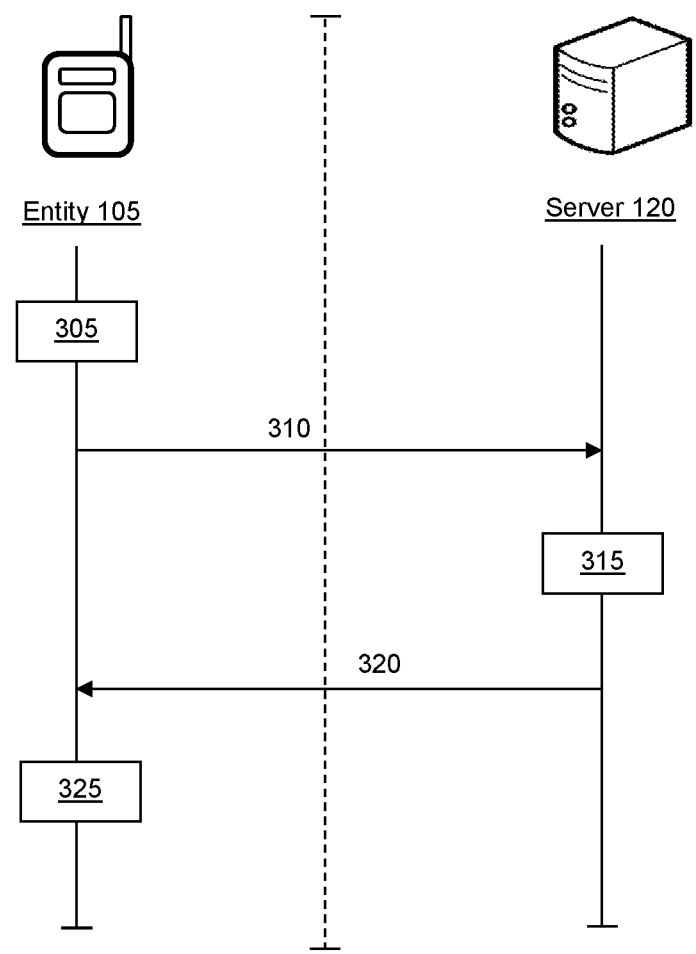
FIG. 3 illustrates a timing diagram for the generation of a private key sk for a device in a self-certified identity based signature scheme in accordance with embodiments of the application.

The generation of a private key for entity 105 is illustrated in FIG. 3. In particular, when entity 105 registers itself with server 120, at step 305, entity 105 will first generate a random number $r_{i1} \epsilon Z_q^*$ where $Z_q^*$ are non-zero residuals of modular q. Entity 105 will then utilize the random number $r_{i1}$ to compute an arbitrary value $R_{i1}$ as $R_{i1}=g^{r_{i1}}$. At step 310, entity 105 then communicates the arbitrary value $R_{i1}$ and its identity, $id_i$, to server 120. The identity, $id_i$, of entity 105 may comprise its user name, email address, telephone number, IP address, MAC address, or any alphanumeric combination that may be utilized to uniquely identify entity 105.

At step 315, server 120 will receive the arbitrary value $R_{i1}$ and the identity of entity 105, $id_i$. Server 120 then selects a random number random number $r_{i2} \, E \, Z_q^*$ where $Z_q^*$ are non-zero residuals of modular q. Based on the selected random number $r_{i2}$ and the received information, server 120 then computes an arbitrary value $R_i$ that is to be accorded to entity 105 as $R_i=R_{i1}g^{r_{i2}}$ or $R_i=R_{i1}/g^{r_{i2}}$ and also computes an integer $s_{i1}$ as $s_{i1}=r_{i2}+xH(R_i, id_i) (\bmod q)$ or $s_{i1}=-r_{i2}+xH(R_i, id_i) (\bmod q)$ where x is the previously generated master secret key "x" and H( ) is the hash function as contained in the parameters of the mpk.

Server 120 then transmits the arbitrary value $R_i$ and the integer $s_{i1}$ to entity 105 at step 320. Upon receiving this information, entity 105, will at step 325 proceed to compute integer $s_i$ as $s_{i1}=s_{i1}+r_{i1}(\bmod q)$. Entity 105 then sets its private key $sk_i$ as $sk_i=(R_i, s_i)$.

In another embodiment of the application, at step 315, based on the selected random number $r_{i2}$ and the information received at this step, server 120 will compute the arbitrary value $R_i$ that is to be accorded to entity 105 as $R_i=g^{r_{i2}}/R_{i1}$ instead and also computes the integer $s_{i1}$ as $s_{i1}=r_{i2}+xH(R_i, id_i)(\bmod q)$ where x is the previously generated master secret key "x" and H( ) is the hash function as contained in the parameters of the mpk.

Server 120 then transmits the arbitrary value $R_i$ and the integer $s_{i1}$ to entity 105 at step 320. Upon receiving this information, entity 105, will at step 325 proceed to compute integer $s_i$ as $s_i=s_{i1}-r_{i1}(\bmod q)$. Entity 105 then sets its private key $sk_i$ as $sk_i=(R_i, s_i)$.

In yet another embodiment of the application, when entity 105 registers itself with server 120, at step 305, entity 105 will first generate a random number $r_{i1} \epsilon Z_q^*$ where $Z_q^*$ are non-zero residuals of modular q. Entity 105 will then utilize the random number $r_{i1}$ to compute an arbitrary value $R_{i1}$ as $R_{i1}=g^{r_{i1}}$. Further, entity 105 will also generate a homomorphic encryption value c defined by $c=HEnc(r_{i1}^{-1} \bmod q)$ where HEnc( ) denotes an additive homomorphic encryption function and HDec( ) denotes a corresponding decryption function. In embodiments of the application, the additive homomorphic encryption/decryption functions are based on Paillier's cryptosystem whereby $HEnc(m_1) \cdot HEnc(m_2)=HEnc(m_1+m_2)$; and $HEnc(m_1^{m_2})=HEnc(m_1 m_2)$.

At step 310, entity 105 then communicates the arbitrary value $R_{i1}$, its identity, $id_i$, and the generated homomorphic encryption value c and the additive homomorphic encryption function to server 120. Similarly, the identity, $id_i$, of entity 105 may comprise its user name, email address, telephone number, IP address, MAC address, or any alphanumeric combination that may be utilized to uniquely identify entity 105.

At step 315, server 120 will receive the homomorphic encryption value c, the arbitrary value $R_{i1}$ and the identity of entity 105, $id_i$. Server 120 then selects a random number $r_{i2} \epsilon Z_q^*$ where $Z_q^*$ are non-zero residuals of modular q. Based on the selected random number $r_{i2}$ and the received information, server 120 then computes an arbitrary value $R_i$ that is to be accorded to entity 105 as $R_i=(R_{i1})^{r_{i2}}$ and also computes an integer $s_{i1}$ as $s_{i1}=HEnc(r_{i2}) \cdot c^{xH(R_i, id_i) \bmod q}$ where x is the previously generated master secret key "x" and H( ) is the hash function as contained in the parameters of the mpk. The integer $s_{i1}$ may be further expanded to $s_{i1}=HEnc(r_{i2}+r_{i1}^{-1}xH(R_i, id_i) \bmod q)$.

Server 120 then transmits the arbitrary value $R_i$ and the integer $s_{i1}$ to entity 105 at step 320. Upon receiving this information, entity 105, will at step 325 proceed to compute integer $s_i$ as $s_i=r_{i1}HDec(s_{i1})=r_{i1}r_{i2}+xH(R_i, id_i)(\bmod q)$. Entity 105 then sets its private key $sk_i$ as $sk_i=(R_i, s_i)$.

In still yet another embodiment of the application, when entity 105 registers itself with server 120, at step 305, entity 105 will first generate a random number $r_{i1} \epsilon Z_q^*$ where $Z_q^*$ are non-zero residuals of modular q. Entity 105 will then utilize the random number $r_{i1}$ to compute an arbitrary value $R_{i1}$ as $R_{i1}=g^{r_{i1}^{-1}}$. Further, entity 105 will generate the homomorphic encryption value c as defined by $c=HEnc(r_{i1})$ where HEnc( ) denotes an additive homomorphic encryption function and HDec( ) denotes a corresponding decryption function.

At step 310, entity 105 then communicates the arbitrary value $R_{i1}$, its identity, $id_i$, and the generated homomorphic encryption value c to server 120.

At step 315, server 120 will receive the homomorphic encryption value c, the arbitrary value $R_{i1}$ and the identity of entity 105, $id_i$. Server 120 then selects a random number $r_{i2} \epsilon Z_q^*$ where $Z_q^*$ are non-zero residuals of modular q. Based on the selected random number $r_{i2}$ and the received information, server 120 then computes an arbitrary value $R_i$ that is to be accorded to entity 105 as $R_i=(R_{i1})^{r_{i2}}$ and also computes an integer $s_{i1}$ as $s_{i1}=HEnc(r_{i2}) \cdot c^{xH(R_i, id_i) \bmod q}$ where x is the previously generated master secret key "x" and H( ) is the hash function as contained in the parameters of the mpk. The integer $s_{i1}$ may be further expanded to $s_{i1}=HEnc(r_{i2}+r_{i1} \cdot xH(R_i, id_i)) \bmod q)$.

Server 120 then transmits the arbitrary value $R_i$ and the integer $s_{i1}$ to entity 105 at step 320. Upon receiving this information, entity 105, will at step 325 proceed to compute integer $s_i$ as $s_i=r_{i1}^{-1}HDec(s_{i1})=r_{i2}/r_{i1}+xH(R_i, id_i)(\bmod q)$. Entity 105 then sets its private key $sk_i$ as $sk_i=(R_i, s_i)$.

In another embodiment of the application, when entity 105 registers itself with server 120, at step 305, entity 105 will first generate a random number $r_{i1} \, E \, Z_q^*$ where $Z_q^*$ are non-zero residuals of modular q. Entity 105 will then utilize the random number $r_{i1}$ to compute an arbitrary value $R_{i1}$ as $R_{i1}=g^{r_{i1}}$. Further, entity 105 will generate the homomorphic encryption value c as defined by $c=HEnc(r_{i1}^{-1})$ where HEnc( ) denotes an additive homomorphic encryption function and HDec( ) denotes a corresponding decryption function.

At step 310, entity 105 then communicates the arbitrary value $R_{i1}$, its identity, $id_i$, and the generated homomorphic encryption value c to server 120.

At step 315, server 120 will receive the homomorphic encryption value c, the arbitrary value $R_{i1}$ and the identity of entity 105, $id_i$. Server 120 then selects a random number $r_{i2} \epsilon Z_q^*$ where $Z_q^*$ are non-zero residuals of modular q. Based on the selected random number $r_{i2}$ and the received information, server 120 then computes an arbitrary value $R_i$ that is to be accorded to entity 105 as $R_i=(R_{i1})^{r_{i2}-1}$ and also computes an integer $s_{i1}$ as $s_{i1}=HEnc(r_{i2}^{-1}) \cdot c^{xH(R_i, id_i) \bmod q}$ where x is the previously generated master secret key "x" and H( ) is the hash function as contained in the parameters of the mpk. The integer $s_{i1}$ may be further expanded to $s_{i1}=\text{HEnc}(r_{i2}^{-1}+r_{i1}^{-1} \cdot xH(R_i, id_i)) \mod q)$.

Server 120 then transmits the arbitrary value $R_i$ and the integer $s_{i1}$ to entity 105 at step 320. Upon receiving this information, entity 105, will at step 325 proceed to compute integer $s_i$ as $s_i=r_{i1} \text{ HDec}(s_{i1})=r_{i1}/r_{i2}+xH(R_i, id_i) \pmod q$. Entity 105 then sets its private key $sk_i$ as $sk_i=(R_i, s_i)$.

It should be noted that private key $sk_i$ generated in accordance with the embodiments set out above may only be computed by entity 105 alone. In other words, server 120 is not empowered to compute private keys for entities in this self-certified identity based signature scheme.

Generation of Private Key with Zero-Knowledge Proof

The above embodiments eliminate the escrow of devices' private keys to the Key Generation Centre. A more general embodiment may require the Key Generation Centre to be provided with adjustable difficulty levels of key escrow generation whereby the difficulty level is governed by a system parameter $\lambda$. In order to incorporate some form of adjustability into the system, a system parameter $\lambda$ is introduced to set the length of random number $r_{i1}$ that may be generated and utilized by entity 105. In this embodiment, which may be applied to any one of the previously described embodiments, a zero-knowledge proof function, ZKP( ) is applied to random number $r_{i1}$ and the system parameter $\lambda$ resulting in $\text{ZKP}(|r_{i1}|, \lambda)$ which shows in a zero-knowledge manner that the length of $r_{i1}$, $|r_{i1}| \leq \lambda$. The detailed workings of the function ZKP( ) are omitted for brevity as this function is known to those skilled in the art. In general, the function ZKP( ) will generate a zero-knowledge proof result using the random number $r_{i1}$ and the system parameter $\lambda$. The zero-knowledge proof result is then transmitted together with $id_i$ and arbitrary $R_{i1}$ from entity 105 to server 120.

When server 120 receives the arbitrary value $R_{i1}$, server 120 will then check the validity of the zero-knowledge proof result before proceeding further. If server 120 determines from the zero-knowledge proof result that the length of $r_{i1}$ is less or equal to the system parameter $\lambda$, system 120 will proceed as normal. Conversely, system 120 will abort the private key generation process.

It should be noted that steps 305-325 as described in the various embodiments above may also be repeated for other entities including entity 110 to generate private key $sk_j$ for entity 110 as $sk_j=(R_j, s_j)$. Further, one skilled in the art will recognize that the embodiments above may be applied to any number of devices or entities to generate private keys for each of the entities in the system.

Generation of Private Key with Cross-Domain KGCs

In another embodiment of the application, another secure server (not shown) may be utilized in place of server 120 to generate private key $sk_j$ for entity 110 as $sk_j=(R_j, s_j)$. This means that steps 305-325 along with the various embodiments as described above may take place in the other secure server with entity 110 instead of with server 120. In this cross-domain authenticated key exchange approach, the private signing key for entity 105 is generated using secure server 120 while the private signing key for entity 110 is generated using another separate secure server (not shown). In such an embodiment, each secure server would have its own set of master secret key "x" and a master public key "y".

Once the private keys have been stored in the secure memory of the respective entities, the entity-pair, i.e. entity 105 and 110, may then commence authentication procedures. Upon successfully authenticating each other, the entity-pair may then proceed to generate a common session key for encoding or signing digital communications sent between each other.

Static Diffie Hellman-based Authenticated Key Exchange Protocol

Figure 4:
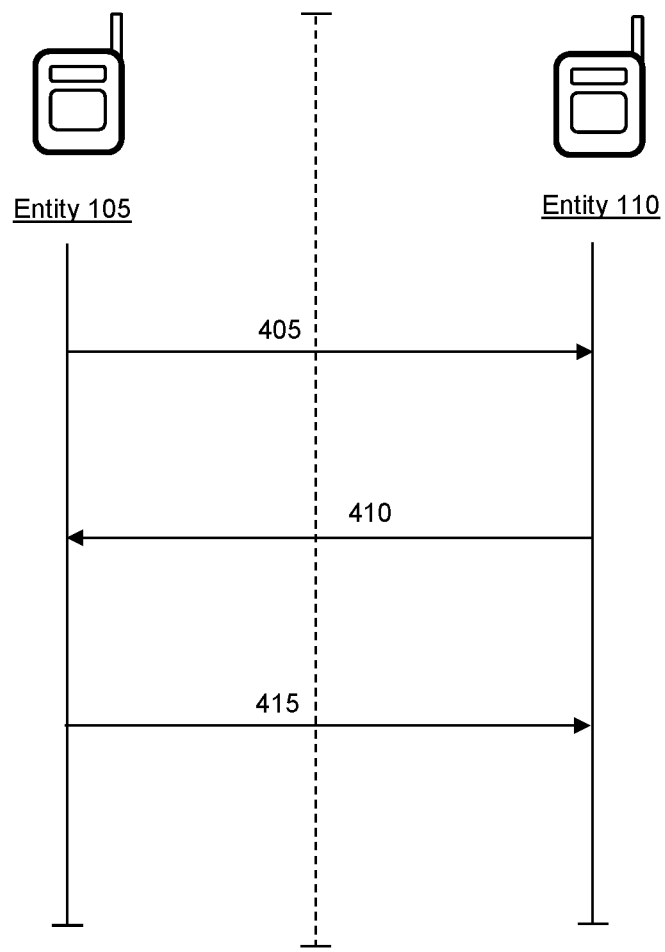
FIG. 4 illustrates a timing diagram for the authentication of an entity-pair and for the generation of a common session key for the authenticated entity-pair in accordance with embodiments of the application.

In embodiments of the application, a static Diffie Hellman-based authenticated key exchange protocol is adopted to generate a common session key between participants 105 and 110. With reference to FIG. 4, entity 105 initiates the authentication process with entity 110 by first selecting a cryptographic nonce, $N_i$. The selected cryptographic nonce may comprise any random or pseudo-random number. Entity 105 then computes a signed cryptographic nonce $c_i$ whereby signed cryptographic nonce $c_i$ is defined by $c_i=\text{SC-IBS.Sign}(sk_i, N_i)$ where SC-IBS.Sign( ) is a signing function for a Self-Certified Identity Based Signature Scheme and $sk_i$ is a private key of entity 105 that was generated using the steps set out in FIG. 3. In other words, cryptographic nonce $N_i$ is signed using the function SC-IBS.Sign( ) and private key $sk_i$.

Entity 105 then proceeds, at step 405, to transmit the identity of entity 105, $id_i$, the value of signed cryptographic nonce $c_i$, and the pseudo-random nonce, $N_i$, to entity 110.

Upon receiving the transmitted information, entity 110 will then proceed to verify $c_i$ using a corresponding Verification function/algorithm associated with the Self-Certified Identity Based Signature Scheme, SC-IBS.Verify( ) and the identity of entity 105, $id_i$. This is done by entity 110 applying the verification function to $c_i$ and the identity $id_i$ thereby producing SC-IBS.Verify($id_i, c_i$) and if the verification fails, entity 110 will abort the process. Else, upon successfully verifying the signed cryptographic nonce $c_i$, entity 110 will then proceed to select a random nonce $N_j$ and will proceed to sign the cryptographic nonce $N_j$ as $c_j=\text{SC-IBS.Sign}(sk_j, N_i\|N_j)$ where $sk_j$ is a private key of entity 110 that was generated using the steps set out in FIG. 3.

Entity 110 then proceeds, at step 410, to transmit the value of signed cryptographic nonce $c_j$, and the pseudo-random nonce, $N_j$, to entity 105

Upon receiving the transmitted information, entity 105 will then proceed to verify $c_j$ using a corresponding Verification function associated with the Self-Certified Identity Based Signature Scheme, SC-IBS.Verify( ) and the identity of entity 110, $id_j$. This is done by entity 105 applying the verification function to $c_j$ together with the identity $id_j$ thereby producing SC-IBS.Verify($id_j, c_j$) and if the verification fails, entity 110 will abort the process. Else, entity 105 will calculate the shared secret $k_{ij}$ where $k_{ij}=g^{s_j \cdot s_i}$ whereby $g^{s_j}=R_j y^{H(R_j, id_j)}$ and $R_j$ is part of $c_j$, calculate a first key $vk_i=\text{KDF}(k_{ij})$ and calculate a first authentication data $Ad_i=\text{AdDF}(vk_i, N_j)$. Once this is done entity 105 then calculates common session key SK as $SK=\text{KDF}(k_{ij}, N_i, N_j)$.

Entity 105 then proceeds, at step 415, to transmit the first authentication data $Ad_i$ to entity 105.

Upon receiving the first authentication data $Ad_i$, entity 110 will calculate the shared secret $k_{ji}$ where $k_{ji}=g^{s_i \cdot s_j}$ whereby $g^{s_i}=R_i y^{H(R_i, id_i)}$ and $R_i$ is part of $c_i$, calculate a second key $vk_j=\text{KDF}(k_{ji})$ and calculate a second authentication data $Ad_j=\text{AdDF}(vk_j, N_j)$. Once this is done entity 105 then determines whether second authentication data $Ad_j$ matches with the received first authentication data $Ad_i$. If a match is not found, the process aborts. Alternatively, if a match is found, entity 110 will calculate common session key SK as $SK=\text{KDF}(k_{ji}, N_i, N_j)$.

In another embodiment of the static Diffie Hellman-based authenticated key exchange protocol, option fields op_f1, op_f2, op_f3, op_f4, op_f5, op_f6 and op_f7 are used and may comprise identities of entities of the system where applicable or any application specific data as determined by the entities themselves.

With reference to FIG. 4, entity 105 initiates the authentication process with entity 110 by first selecting a cryptographic nonce, $N_i$. Entity 105 then computes a signed cryptographic nonce $c_i$ whereby signed cryptographic nonce $c_i$ is defined by $c_i$=SC-IBS.Sign($sk_i$, $N_i$||op_f1) where SC-IBS.Sign( ) is a signing function for a Self-Certified Identity Based Signature Scheme and $sk_i$ is a private key of entity 105 that was generated using the steps set out in FIG. 3. In other words, cryptographic nonce $N_i$ is signed using the function SC-IBS.Sign( ) and private key $sk_i$.

Entity 105 then proceeds, at step 405, to transmit an option field op_f2, the identity of entity 105, $id_i$, the value of signed cryptographic nonce $c_i$, and the pseudo-random nonce, $N_i$, to entity 110.

Upon receiving the transmitted information, entity 110 will then proceed to verify $c_i$ using a corresponding Verification function associates with the Self-Certified Identity Based Signature Scheme, SC-IBS.Verify( ) and the identity of entity 105, $id_i$. This is done by entity 110 applying the verification function to $c_i$ and the identity $id_i$ thereby producing SC-IBS.Verify($id_i$, $c_i$) and if the verification fails, entity 110 will abort the process. Else, upon successfully verifying the signed cryptographic nonce $c_i$, entity 110 will then proceed to select a random nonce $N_j$ and will proceed to sign the cryptographic nonce $N_j$ as $c_j$=SC-IBS.Sign($sk_j$, $N_i$||$N_j$||op_f3) where $sk_j$ is a private key of entity 110 that was generated using the steps set out in FIG. 3.

Entity 110 then proceeds, at step 410, to transmit an option field op_f4, the value of signed cryptographic nonce $c_j$, and the pseudo-random nonce, $N_j$, to entity 105

Upon receiving the transmitted information, entity 105 will then proceed to verify $c_j$ using a corresponding Verification function associated with the Self-Certified Identity Based Signature Scheme, SC-IBS.Verify( ) and the identity of entity 110, $id_j$. This is done by entity 105 applying the verification function to $c_j$ together with the identity $id_j$ thereby producing SC-IBS.Verify($id_j$, $c_j$) and if the verification fails, entity 110 will abort the process. Else, entity 105 will calculate the shared secret $k_{ji}$ where $k_{ji}=g^{s_j \cdot s_i}$ calculate a first key $vk_i$=KDF($k_{ji}$, op_f5) and calculate a first authentication data $Ad_i$=AdDF($vk_i$, $N_j$, op_f6). Once this is done entity 105 then calculates common session key SK as SK=KDF($k_{ji}$, $N_i$, $N_j$, op_f7).

Entity 105 then proceeds, at step 415, to transmit the first authentication data $Ad_i$ to entity 110.

Upon receiving the first authentication data $Ad_i$, entity 110 will calculate the shared secret $k_{ji}$ where $k_{ji}=g^{s_i \cdot s_j}$, calculate a second key $vk_j$=KDF($k_{ji}$, op_f5) and calculate a second authentication data $Ad_j$=AdDF($vk_j$, $N_j$, op_f6). Once this is done entity 105 then determines whether second authentication data $Ad_j$ matches with the received first authentication data $Ad_i$. If a match is not found, the process aborts. Alternatively, if a match is found, entity 110 will calculate common session key SK as SK=KDF($k_{ji}$, $N_i$, $N_j$, op_f7).

In yet another embodiment of the application, in the steps described above, the cryptographic nonces $N_i$ and $N_j$ may be replaced with ephemeral Diffie Hellman (DH) public values $g^a$ and $g^b$, and $k_{ij}$, $k_{ji}$ are derived from both $g^{s_i \cdot s_j}$ and $g^{ab}$. Such an embodiment would inherit all the features of an ephemeral DH-based protocol and is more secure.

Static Diffie Hellman-based Authenticated Key Exchange Protocol Extended to TLS

In still yet another embodiment of the application, the above idea of static Diffie-Hellman key exchange may be extended to Transport Layer Security (TLS) or Datagram Transport Layer Security (DTLS). In particular, the steps above in generating the shared secret $k_{ij}$ (as well as $k_{ji}$) between entity 105 and entity 110 are actually in the same spirit as the static DH-based cipher-suites contained in TLS v1.2. It is thus easy for those skilled in the art to extend conventional TLS such as TLS v1.2 to include a set of static DH-based cipher-suites based on self-certified IBS as above. In this embodiment of the application, the Server Certificate message in the TLS protocol is set to be entity 110's $id_j$ and its key specific data $R_j$; and the Client Message in the TLS protocols is set to be the entity 105's $id_i$ and its key specific data $R_i$; other steps and operations of the TLS protocol follow the specification of TLS with the accommodation of the corresponding changes due to the use of self-certified Identity Based Signature in a straightforward way.

Ephemeral Diffie Hellman (DH)—based Authenticated Key Exchange Protocol

In yet still another embodiment of the application, an ephemeral Diffie Hellman (DH)-based authenticated key exchange protocol is adopted to generate a common session key between participants 105 and 110. Entities 105 and 110 will each have private keys that correspond to a self-certified IBS scheme of either ISO/IEC 29192-4 or IETF RFC 6507.

With reference to FIG. 4, entity 105 initiates the authentication process with entity 110 by first selecting a random value a $\in Z_q^*$ and by computing a signed $c_i$ whereby $c_i$ is defined by $c_i$=SC-IBS.Sign($sk_i$, $g^a$) where SC-IBS.Sign( ) is a signing function for a Self-Certified Identity Based Signature Scheme, $sk_i$ is a private key of entity 105 that was generated using the steps set out in FIG. 3 and $g^a$ is the group element. In other words, group element $g^a$ is signed using the function SC-IBS.Sign( ) and private key $sk_i$.

Entity 105 then proceeds, at step 405, to transmit the identity of entity 105, $id_i$, the value of signed $c_i$, and the group element $g^a$, to entity 110.

Upon receiving the transmitted information, entity 110 will then proceed to verify $c_i$ using a corresponding Verification function associated with the Self-Certified Identity Based Signature Scheme, SC-IBS.Verify( ) and the identity of entity 105, $id_i$. This is done by entity 110 applying the verification function to $c_i$ and the identity $id_i$ thereby producing SC-IBS.Verify($id_i$, $c_i$) and if the verification fails, entity 110 will abort the process. Else, upon successfully verifying $c_i$, entity 110 will then proceed to select a random value b, where b $\in Z_q^*$ and will proceed to compute $c_j$=SC-IBS.Sign($sk_j$, $g^a$||$g^b$) where $sk_j$ is a private key of entity 110 that was generated using the steps set out in FIG. 3.

Entity 110 then proceeds, at step 410, to transmit the value of signed group element $c_j$, and the group element $g^b$ to entity 105.

Upon receiving the transmitted information, entity 105 will then proceed to verify $c_j$ using a corresponding Verification function associated with the Self-Certified Identity Based Signature Scheme, SC-IBS.Verify( ) and the identity of entity 110, $id_j$. This is done by entity 105 applying the verification function to $c_j$ together with the identity $id_j$ thereby producing SC-IBS.Verify($id_j$, $c_j$) and if the verification fails, entity 105 will abort the process. Else, entity 105 will calculate the shared secret $k_{ij}$ where $k_{ij}=g^{a \cdot b}$ calculate a first key $vk_i$=KDF($k_{ij}$) and calculate a first authentication data $Ad_i$=AdDF($vk_i$). Once this is done entity 105 then calculates common session key SK as SK=KDF($k_{ij}$).

Entity 105 then proceeds, at step 415, to transmit the first authentication data $Ad_i$ to entity 110.

Upon receiving the first authentication data $Ad_i$, entity 110 will calculate the shared secret $k_{ji}$ where $k_{ji}=g^{a \cdot b}$, calculate a second key $vk_j=KDF(k_{ji})$ and calculate a second authentication data $Ad_j=AdDF(vk_j)$. Once this is done entity 110 then determines whether second authentication data $Ad_j$ matches with the received first authentication data $Ad_i$. If a match is not found, the process aborts. Alternatively, if a match is found, entity 110 will calculate common session key SK as $SK=KDF(k_{ji})$.

Ephemeral DH—based Authenticated Key Exchange Protocol for Cross-Domain KGCs

In another embodiment of the ephemeral Diffie Hellman-based authenticated key exchange protocol, the key generation centres of entities 105 and 110 are from different domains (i.e. the two key generation centres have their own respective master secret keys and master public keys). In this embodiment, prior to transmitting the identity of entity 105, $id_i$, the value of signed $c_i$, and the group element $g^a$, to entity 110 at step 405, entity 105 will share the master public key of its key generation centre with entity 110 and similarly, entity 110 will share the master public key of its key generation centre with entity 105. In addition, entity 105 may negotiate with entity 110 to determine a generator g of an appropriate finite field group that is to be used. Regardless, the master public keys to be adopted by both entities must be known to each other and g must be determined prior to step 405 so that entities 105 and 110 are able to subsequently verify each other's' signatures and carry out ephemeral Diffie Hellman key exchange. Steps 410-415 then proceeds as described above.

Ephemeral DH—based Authenticated Key Exchange Protocol extended to TLS Protocol

In still yet another embodiment of the application, the idea above may be used to extend Transport Layer Security (TLS) or Datagram Transport Layer Security (DTLS). In particular, the steps above may be fitted to the TLS protocol between entity 105 and entity 110, based on the use of a self-certified Identity Based Signature scheme. In this embodiment of the application, a self-certified IBS scheme is used in place of the DSS/ECDSA or RSA digital signature schemes in the conventional TLS handshake protocol; besides, set the Server Certificate message and the Client Message in the TLS protocol to be the entity 110's $id_j$ and the entity 105's $id_i$, respectively, while the key specific data (KSDs) of entity 110 and the entity 105 are part of the respective entity's signature; other steps and operations in the TLS protocol follow the TLS specification with the accommodation of the straightforward due changes because of the use of self-certified Identity Based Signature. In this embodiment of the application, entity 105' private key $sk_i$ and entity 110's private key $sk_j$ may be generated as per any above embodiment of generation of a private key, or as per the key generation process of existing self-certified IBS schemes such as ISO/IEC 29192-4 and IETF RFC, or as per the above embodiment of generation of private key with cross-domain KGCs.

In another embodiment of the ephemeral Diffie Hellman-based authenticated key exchange protocol option fields op_f1, op_f2, op_f3, op_f4, op_f5, op_f6 and op_f7 are used and may comprise identities of entities of the system where applicable or any application specific data as determined by the entities themselves.

With reference to FIG. 4, entity 105 initiates the authentication process with entity 110 by first selecting a random value $a \in Z_q^*$ and by computing a signed group element $c_i$ whereby signed group element $c_i$ is defined by $c_i$=SC-IBS.Sign($sk_i$, $g^a$||op_$f_1$)) where SC-IBS.Sign( ) is a signing function for a Self-Certified Identity Based Signature scheme, $sk_i$ is a private key of entity 105 that was generated using the steps set out in FIG. 3 and $g^a$ is the group element. In other words, group element $g^a$ is signed using the function SC-IBS.Sign( ) and private key $sk_i$.

Entity 105 then proceeds, at step 405, to transmit an option field op_f2, the identity of entity 105, $id_i$, the value of signed $c_i$, and the group element $g^a$, to entity 110.

Upon receiving the transmitted information, entity 110 will then proceed to verify $c_i$ using a corresponding Verification function associated with the Self-Certified Identity Based Signature scheme, SC-IBS.Verify( ) and the identity of entity 105, $id_i$. This is done by entity 110 applying the verification function to $c_i$ and the identity $id_i$ thereby producing SC-IBS.Verify($id_i$, $c_i$) and if the verification fails, entity 110 will abort the process. Else, upon successfully verifying the signed cryptographic nonce $c_i$, entity 110 will then proceed to select a random value b, where $b \in Z_q^*$ and will proceed to compute $c_j$=SC-IBS.Sign($sk_j$, $g^a$||$g^b$||op_f3) where $sk_j$ is a private key of entity 110 that was generated using the steps set out in FIG. 3.

Entity 110 then proceeds, at step 410, to transmit an option field op_f4, the value of signed $c_j$, and the group element $g^b$ to entity 105.

Upon receiving the transmitted information, entity 105 will then proceed to verify $c_j$ using a corresponding Verification function associated with the Self-Certified Identity Based Signature Scheme, SC-IBS.Verify( ) and the identity of entity 110, $id_j$. This is done by entity 105 applying the verification function to $c_j$ together with the identity $id_j$ thereby producing SC-IBS.Verify($id_j$, $c_j$) and if the verification fails, entity 110 will abort the process. Else, entity 105 will calculate the shared secret $k_{ij}$ where $k_{ij}=g^{a \cdot b}$ calculate a first key $vk_i$=KDF($k_{ij}$, op_f5) and calculate a first authentication data $Ad_i$=AdDF($vk_i$, op_f6). Once this is done entity 105 then calculates common session key SK as SK=KDF($k_{ij}$, op_f7).

Entity 105 then proceeds, at step 415, to transmit the first authentication data $Ad_i$ to entity 110.

Upon receiving the first authentication data $Ad_i$, entity 110 will calculate the shared secret $k_{ji}$ where $k_{ji}=g^{a \cdot b}$ calculate a second key $vk_j$=KDF($k_{ji}$, op_f5) and calculate a second authentication data $Ad_j$=AdDF($vk_j$, op_f6). Once this is done entity 110 then determines whether second authentication data $Ad_j$ matches with the received first authentication data $Ad_i$. If a match is not found, the process aborts. Alternatively, if a match is found, entity 110 will calculate common session key SK as SK=KDF($k_{ij}$, op_f7).

In accordance with an embodiment of the application, a method for generating a private key sk for a device participating in a self-certified identity based signature system comprises the following three steps:

Step 1, computing, by a secure server, parameters for the device based on a second random number $r_{i2}$ generated by the secure server, a first set of components received from the device, a master secret key x and parameters associated with a master public key mpk, wherein the first set of components comprises a first random number $r_{i1}$ generated by the device;

Step 2, transmitting, by the secure server, the computed parameters to the device; and Step 3, computing, by the device, the private key sk based on the received computed parameters and the random number $r_{i1}$.

In order to provide such a system or method, a process is needed for generating secret private keys for entities of the system, and for authenticating an entity of an entity-pair before a common session key is generated for encoding or signing digital messages between the entity-pair. The following description and FIGS. 3-5 describe embodiments of processes in accordance with this application.

Figure 5:
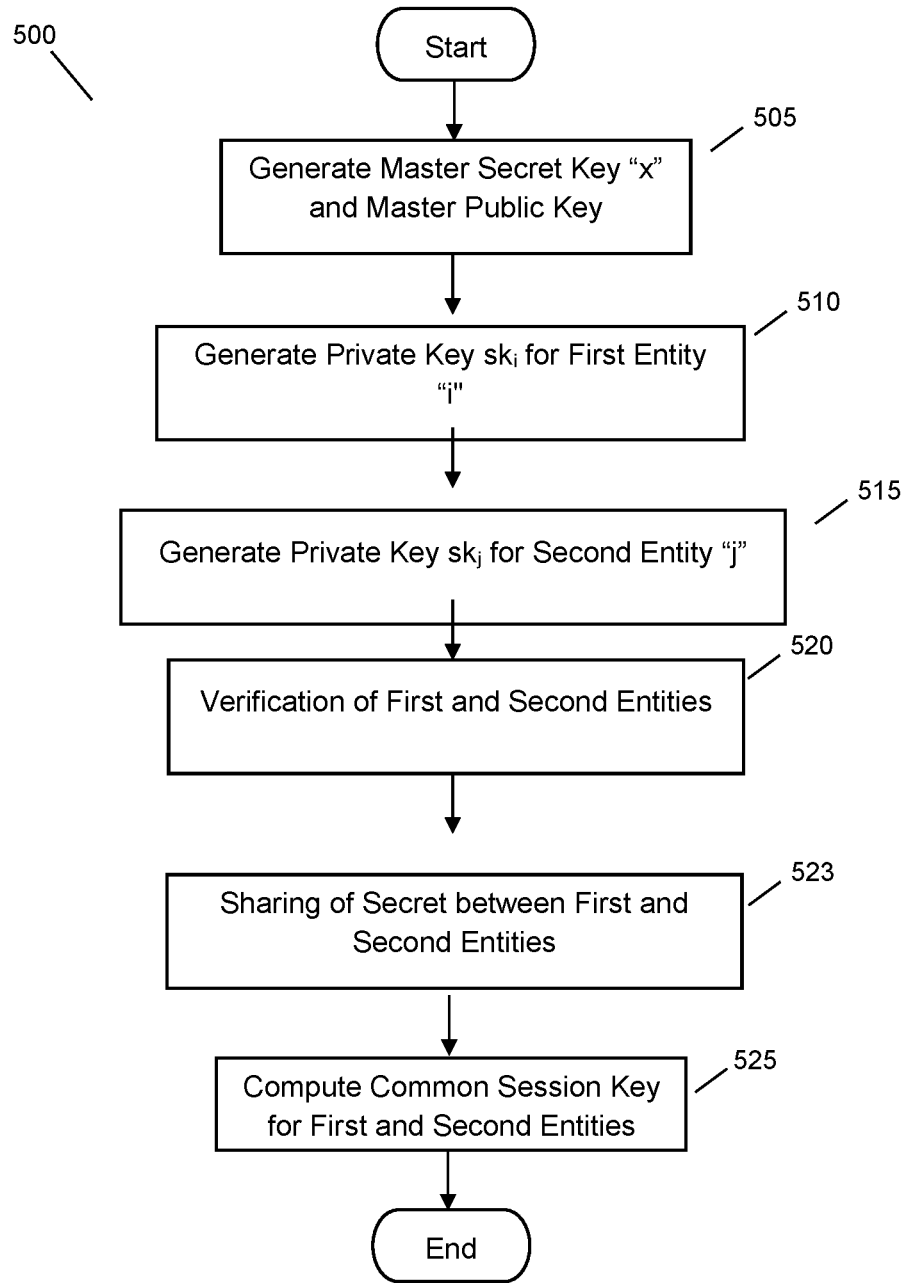
FIG. 5 illustrates a flow diagram of a process for verifying the authenticity of a second entity and for generating a common session key in accordance with embodiments of the application.

FIG. 5 illustrates process 500 that is performed by a secure server configured as a Key Generation Centre, a first entity "i" and a second entity "j" for generating secret private keys for entities of the system, and for authenticating an entity of an entity-pair before a common session key is generated for encoding or signing digital messages between the entity-pair. Process 500 begins at step 505 with the secure server generating a master secret key "x" and a master public key "y". When first entity, i, registers itself with the secure server, the secure server will carry out the steps as illustrated in FIG. 3 and as described in the description above to generate a private key, $sk_i$, for the first entity using the first entity's identity, $id_i$. All this takes place at step 510.

At step 515, when the next entity, that is when second entity, j, registers itself with the secure server, the secure server will carry out the steps as illustrated in FIG. 3 and as described in the description above to generate a private key, $sk_j$, for the second entity using the second entity's identity, $id_j$.

The first and second entities then verifies information sent between entities using signing functions and corresponding verification functions associated with self-certified identity based signature schemes at step 520.

Once both entities are verified, a secret is then shared between entities at step 523. The shared secret is then utilized to generate a common session key for the entities. The generated common session key may then be used to sign or encode any digital messages that are exchanged between the first and second entities. Process 500 then ends.

The above is a description of embodiments of a system and process in accordance with the present application. It is envisioned that others may and will design alternatives that fall within the scope of the present application.

What is claimed is:

1. A system, comprising:
a secure server; and
a device;
wherein the secure server is configured to:
compute parameters for the device based on a second random number $r_{i2}$ generated by the secure server, a first set of components received from the device, a master secret key x, and parameters associated with a master public key mpk, wherein the first set of components comprises a first random number $r_{i1}$ generated by the device, an arbitrary first value $R_{i1}$, and an identity $id_i$ of the device, and wherein the arbitrary first value $R_{i1}$ is generated based on the first random number $r_{i1}$; and
transmit the computed parameters to the device; and
wherein the device is configured to compute a private key sk based on the received computed parameters and the first random number $r_{i1}$, wherein the private key sk is for the device to participate in a self-certified identity based signature system,
wherein computing the parameters for the device comprises:
retrieving the arbitrary first value $R_{i1}$, the identity $id_i$ of the device, and a homomorphic encryption value c from the first set of components, wherein the homomorphic encryption value c is generated by providing the first random number $r_{i1}$ and a prime number q obtained from the parameters associated with the master public key mpk to an additive homomorphic encryption function HEnc( ); and setting an arbitrary value $R_i$ of the device and a first integer $s_{i1}$ as the parameters for the device, wherein the arbitrary value $R_i$ of the device is computed based on the arbitrary first value $R_{i1}$ and the second random number $r_{i2}$, and wherein the first integer $s_{i1}$ is computed by providing the second random number $r_{i2}$, the homomorphic encryption value c, the master secret key x, the arbitrary value $R_i$ of the device, the identity $id_i$ of the device and the prime number q to the additive homomorphic encryption function HEnc( ).

2. The system according to claim 1, wherein computing the private key sk comprises:
computing an integer $s_i$ by applying a complementary homomorphic decryption function to the first integer $s_{i1}$ as retrieved from the computed parameters transmitted from the secure server; and
forming the private key sk based on the arbitrary value $R_i$ of the device and the integer $s_i$.

3. The system according to claim 1, wherein the arbitrary value $R_i$ of the device is defined by $R_i=(R_{i1})^{r_{i2}}$, the arbitrary first value $R_{i1}$ is defined by $R_{i1}=g^{r_{i1}}$, the homomorphic encryption value c is defined by $c=\text{HEnc}(r_{i1}^{-1} \mod q)$, and the first integer $s_{i1}$ is defined by $s_{i1}=\text{HEnc}(r_{i2}) \cdot c^{xH(R_i,id_i) \mod q}$, where HEnc( ) is the additive homomorphic encryption function.

4. The system according to claim 1, wherein the arbitrary value $R_i$ of the device is defined by $R_i=(R_{i1})^{r_{i2}^{-1}}$, the arbitrary first value $R_{i1}$ is defined by $R_{i1}=g^{r_{i1}}$, the homomorphic encryption value c is defined by $c=\text{HEnc}(r_{i1}^{-1})$, and the first integer $s_{i1}$ is defined by $s_{i1}=\text{HEnc}(r_{i2}^{-1}) \cdot c^{xH(R_i,id_i) \mod q}$, where HEnc( ) is the additive homomorphic encryption function.

5. The system according to claim 2, wherein the integer $s_i$ is defined by $s_i=r_{i1}\text{HDec}(s_{i1})$, where HDec( ) is the complementary homomorphic decryption function.

6. The system according to claim 1, wherein the arbitrary value $R_i$ of the device is defined by $R_i=(R_{i1})^{r_{i2}}$, the arbitrary first value $R_{i1}$ is defined by $R_i=g^{r_{i1}}$, the homomorphic encryption value c is defined by $c=\text{HEnc}(r_{i1})$, and the first integer $s_{i1}$ is defined by $s_{i1}=\text{HEnc}(r_{i2}) \cdot c^{xH(R_i,id_i) \mod q}$, where HEnc( ) is the additive homomorphic encryption function.

7. The system according to claim 2, wherein the integer $s_i$ is defined by $s_i=r_{i1}^{-1}\text{HDec}(s_{i1})$, where HDec( ) is the complementary homomorphic decryption function.

8. A system, comprising:
a secure server;
a first device; and
a second device;
wherein the secure server is configured to:
instruct the first device to compute a private key $sk_i$ based on a first set of parameters received from the secure server and based on a first random number $r_{i1}$ generated by the first device, wherein the first set of parameters is generated by the secure server based on a second random number $r_{i2}$ generated by the secure server, a first set of components, a master secret key x, and parameters associated with a master public key mpk, wherein the first set of components is generated by the first device and transmitted to the secure server, wherein the first set of components comprises the first random number $r_{i1}$, an arbitrary first value $R_{i1}$, and an identity $id_i$ of the first device, and wherein the arbitrary first value $R_{i1}$ is generated based on the first random number $r_{i1}$; and
instruct the second device to compute a private key $sk_j$ based on a second set of parameters received from the secure server and based on a first random number $r_{j1}$ generated by the second device, wherein the second set of parameters is generated by the secure server based on a second random number $r_{j2}$ generated by the secure server, a second set of components, the master secret key x, and the parameters associated with a master public key mpk, wherein the second set of components is generated by the second device and transmitted to the secure server, wherein the second set of components comprises the first random number $r_{j1}$, an arbitrary first value $R_{j1}$, and an identity $id_j$ of the second device, and wherein the arbitrary first value $R_{j1}$ is generated based on the first random number $r_{j1}$; and wherein the first and second devices are configured to use a self-certified identity based signature scheme to generate a common session key SK for encoding digital communications between the first and second devices with respect to an extended Transport Layer Security (TLS) protocol or an extended Datagram Transport Layer Security protocol (DTLS), wherein the identity $id_i$ of the first device is included in a certificate message of the first device and the identity $id_j$ of the second device is included in a certificate message of the second device, and wherein the self-certified identity based signature scheme is dictated by the private keys $sk_i$ and $sk_j$, wherein the secure server is configured to generate the second set of parameters for the second device, wherein generating the second set of parameters for the second device comprises:

retrieving the arbitrary first value $R_j$ and the identity $id_j$ of the second device from the second set of components;

computing an arbitrary value $R_j$ of the second device and a first integer $s_{j1}$; and setting the computed arbitrary value $R_j$ of the second device and the first integer $s_{j1}$ as the second set of parameters for the second device, wherein the arbitrary value $R_j$ of the second device is computed based on the arbitrary first value $R_j$ and the second random number $r_{j2}$, and wherein the first integer $s_{j1}$ is computed based on the second random number $r_{j2}$, the master secret key x, the arbitrary value $R_j$ of the second device, the identity $id_j$ of the second device, and a prime number q obtained from the parameters associated with the master public key mpk.

9. The system according to claim 8, wherein the secure server is configured to generate the first set of parameters for the first device, wherein generating the first set of parameters for the first device comprises:

retrieving the arbitrary first value $R_{i1}$ and the identity $id_i$ of the first device from the first set of components;

computing an arbitrary value $R_i$ of the first device and a first integer $s_{i1}$; and setting the computed arbitrary value R of the first device and the first integer $s_{i1}$ as the first set of parameters for the first device, wherein the arbitrary value $R_i$ of the first device is computed based on the arbitrary first value $R_{i1}$ and the second random number $r_{i2}$, and wherein the first integer $s_{i1}$ is computed based on the second random number $r_{i2}$, the master secret key x, the arbitrary value $R_i$ of the first device, the identity $id_i$ of the first device, and a prime number q obtained from the parameters associated with the master public key mpk.

10. The system according to claim 9, wherein the first device is configured to compute the private key $sk_i$, wherein computing the private key $sk_i$ comprises:

computing an integer $s_i$ based on the first integer $s_{i1}$ as retrieved from the first set of parameters, the first random number $r_{i1}$, and a prime number q as obtained from the parameters associated with the master public key mpk; and forming the private key $sk_i$ based on the arbitrary value $R_i$ of the first device and the integer $s_i$.

11. The system according to claim 8, wherein the second device is configured to compute the private key $sk_j$, wherein computing the private key $sk_j$ comprises:

computing an integer $s_j$ based on the first integer $s_{j1}$ as retrieved from the second set of parameters, the first random number $r_{j1}$, and a prime number q as obtained from the parameters associated with the master public key mpk; and forming the private key $sk_j$ based on the arbitrary value $R_j$ of the second device and the integer $s_j$.

12. A system, comprising:
a first secure server;
a second secure server;
a first device; and
a second device;

wherein the first secure server is configured to instruct the first device to compute a private key $sk_i$ based on a first set of parameters received from the first secure server and based on a first random number $r_{i1}$ generated by the first device, wherein the first set of parameters is generated by the first secure server based on a second random number $r_{i2}$ generated by the first secure server, a first set of components, a master secret key $x_i$, and parameters associated with a master public key $mpk_i$, and wherein the first set of components is generated by the first device and transmitted to the first secure server, wherein the first set of components comprises the first random number $r_{i1}$, an arbitrary first value $R_{i1}$, and an identity $id_i$ of the first device, and wherein the arbitrary first value $R_{i1}$ is generated based on the first random number $r_{i1}$;

wherein the second secure server is configured to instruct the second device to compute a private key $sk_j$ based on a second set of parameters received from the second secure server and based on a first random number $r_{j1}$ generated by the second device, wherein the second set of parameters is generated by the second secure server based on a second random number $r_{j2}$ generated by the second secure server, a second set of components, the master secret key $x_j$ and the parameters associated with a master public key $mpk_j$, wherein the second set of components is generated by the second device and transmitted to the second secure server, wherein the second set of components comprises the first random number $r_{j1}$, an arbitrary first value $R_{j1}$, and an identity $id_j$ of the second device, and wherein the arbitrary first value $R_{j1}$ is generated based on the first random number $r_{j1}$;

wherein the first secure server is located in a different domain from the second secure server;

wherein the first and second devices are configured to use a self-certified identity based signature scheme to generate a common session key $SK_{ij}$ for encoding digital communications between the first and second devices with respect to an extended Transport Layer Security (TLS) protocol or an extended Datagram Transport Layer Security protocol (DTLS), wherein the identity $id_i$ of the first device is included in a certificate message of the first device and the identity $id_j$ of the second device is included in a certificate message of the second device, and wherein the self-certified identity based signature scheme is dictated by the private keys $sk_i$ and $sk_j$;

wherein the first secure server is configured to generate the first set of parameters for the first device, wherein generating the first set of parameters for the first device comprises:

retrieving the arbitrary first value $R_{i1}$ and the identity $id_i$ of the first device from the first set of components;

computing an arbitrary value $R_i$ of the first device and a first integer $s_{i1}$; and setting the computed arbitrary value $R_i$ of the first device and the first integer $s_{i1}$ as the first set of parameters for the first device, wherein the arbitrary value $R_i$ of the first device is computed based on the arbitrary first value $R_{i1}$ and the second random number $r_{i2}$, and wherein the first integer $s_{i1}$ is computed based on the second random number $r_{i2}$, the master secret key $x_i$, the arbitrary value $R_i$ of the first device, the identity $id_i$ of the first device and a prime number q obtained from the parameters associated with the master public key $mpk_i$.

13. The system according to claim 12, wherein the first device is configured to compute the private key $sk_i$, wherein computing the private key $sk_i$ comprises:

computing an integer $s_i$ based on the first integer $s_{i1}$ as retrieved from the first set of parameters, the first random number $r_{i1}$, and a prime number q as obtained from the parameters associated with the master public key $mpk_i$; and forming the private key $sk_i$ based on the arbitrary value $R_i$ of the first device and the integer $s_i$.

14. The system according to claim 12, wherein the second secure server is configured to generate the second set of parameters for the second device, wherein generating the second set of parameters for the second device comprises:

retrieving the arbitrary first value $R_{j1}$ and the identity $id_j$ of the second device from the second set of components;

computing an arbitrary value $R_j$ of the second device and a first integer $s_{j1}$; and setting the computed arbitrary value $R_j$ of the second device and the first integer $s_{j1}$ as the second set of parameters for the second device, wherein the arbitrary value $R_j$ of the second device is computed based on the arbitrary first value $R_{j1}$ and the second random number $r_{j2}$, and wherein the first integer $s_{j1}$ is computed based on the second random number $r_{j2}$, the master secret key $x_j$, the arbitrary value $R_j$ of the second device, the identity $id_j$ of the second device and a prime number q obtained from the parameters associated with the master public key $mpk_j$.

15. The system according to claim 14, wherein the second device is configured to compute the private key $sk_j$, wherein computing the private key $sk_j$ comprises:

computing an integer $s_j$ based on the first integer $s_{j1}$ as retrieved from the second set of parameters, the first random number $r_{j1}$, and a prime number q as obtained from the parameters associated with the master public key $mpk_j$; and forming the private key $sk_j$ based on the arbitrary value $R_j$ of the second device and the integer $s_j$.

16. The system according to claim 12, wherein the secure server is configured to:

receive a zero-knowledge proof result from a respective device, wherein the zero-knowledge proof result is generated by the respective device using the first random number $r_{i1}$ and a system parameter λ;

determine from the zero-knowledge proof result whether or not the first random number $r_{i1}$ is less than or equal to the system parameter λ; and based on the first random number $r_{i1}$ being less than or equal to the system parameter λ, compute parameters for the respective device based on the second random number $r_{i2}$ generated by the secure server.

17. A secure server, comprising:

a processor; and a non-transitory medium readable by the processor having processor-executable instructions stored thereon, wherein the processor-executable instructions, when executed by the processor, facilitate:

computing parameters for a device based on a second random number $r_{i2}$ generated by the secure server, a first set of components received from the device, a master secret key x, and parameters associated with a master public key mpk, wherein the first set of components comprises a first random number $r_{i1}$ generated by the device, an arbitrary first value $R_{i1}$, and an identity $id_i$ of the device, and wherein the arbitrary first value $R_{i1}$ is generated based on the first random number $r_{i1}$; and transmitting the computed parameters to the device to facilitate the device computing a private key sk based on the received computed parameters and the first random number $r_{i1}$, wherein the private key sk is for the device to participate in a self-certified identity based signature system, wherein computing the parameters for the device comprises:

retrieving the arbitrary first value $R_i$ and the identity $id_i$ of the device from the first set of components;

computing an arbitrary value $R_i$ of the device and a first integer $s_{i1}$; and setting the computed arbitrary value $R_i$ of the device and the first integer $s_{i1}$ as the parameters for the device, wherein the arbitrary value $R_i$ of the device is computed based on the arbitrary first value $R_{i1}$ and the second random number $r_{i2}$, and wherein the first integer $s_{i1}$ is computed based on the second random number $r_{i2}$, the master secret key x, the arbitrary value $R_i$ of the device, the identity $id_i$ of the device, and a prime number q obtained from the parameters associated with the master public key mpk.

18. The secure server according to claim 17, wherein computing the parameters for the device comprises:

retrieving the arbitrary first value $R_i$, the identity $id_i$ of the device, and a homomorphic encryption value c from the first set of components, and wherein the homomorphic encryption value c is generated by providing the first random number $r_{i1}$ and a prime number q obtained from the parameters associated with the master public key mpk to an additive homomorphic encryption function HEnc( ); and setting an arbitrary value $R_i$ of the device and a first integer $s_{i1}$ as the parameters for the device, wherein the arbitrary value $R_i$ of the device is computed based on the arbitrary first value $R_{i1}$ and the second random number $r_{i2}$, and wherein the first integer $s_{i1}$ is computed by providing the second random number $r_{i2}$, the homomorphic encryption value c, the master secret key x, the arbitrary value $R_i$ of the device, the identity $id_i$ of the device and the prime number q to the additive homomorphic encryption function HEnc( ).

19. The secure server according to claim 17, wherein the processor-executable instructions, when executed by the processor, further facilitate:
receiving a zero-knowledge proof result from a respective device, wherein the zero-knowledge proof result is generated by the respective device using the first random number $r_{i1}$ and a system parameter $\lambda$;
determining from the zero-knowledge proof result whether or not the first random number $r_{i1}$ is less than or equal to the system parameter $\lambda$; and
based on the first random number $r_{i1}$ being less than or equal to the system parameter $\lambda$, computing parameters for the respective device based on the second random number $r_{i2}$ generated by the secure server.

20. A method, comprising:
computing, by a secure server, parameters for a device based on a second random number $r_{i2}$ generated by the secure server, a first set of components received from the device, a master secret key x, and parameters associated with a master public key mpk, wherein the first set of components comprises a first random number $r_{i1}$ generated by the device, an arbitrary first value $R_{i1}$, and an identity $id_i$ of the device, and wherein the arbitrary first value $R_{i1}$ is generated based on the first random number $r_{i1}$; and
transmitting, by the secure server, the computed parameters to the device to facilitate the device computing a private key sk based on the received computed parameters and the first random number $r_{i1}$, wherein the private key sk is for the device to participate in a self-certified identity based signature system,
wherein computing the parameters for the device comprises:
retrieving the arbitrary first value $R_{i1}$, the identity $id_i$ of the device, and a homomorphic encryption value c from the first set of components, wherein the arbitrary first value $R_{i1}$ is generated based on the first random number $r_{i1}$ and the homomorphic encryption value c is generated by providing the first random number $r_{i1}$ and a prime number q obtained from the parameters associated with the master public key mpk to an additive homomorphic encryption function HEnc( ); and
setting an arbitrary value $R_i$ of the device and a first integer $s_{i1}$ as the parameters for the device, wherein the arbitrary value $R_i$ of the device is computed based on the arbitrary first value $R_{i1}$ and the second random number $r_{i2}$, and wherein the first integer $s_{i1}$ is computed by providing the second random number $r_{i2}$, the homomorphic encryption value c, the master secret key x, the arbitrary value $R_i$ of the device, the identity $id_i$ of the device, and the prime number q to the additive homomorphic encryption function HEnc( ).

21. The method according to claim 20, wherein computing the parameters for the device comprises:
retrieving the arbitrary first value $R_{i1}$ and the identity $id_i$ of the device from the first set of components;
computing an arbitrary value $R_i$ of the device and a first integer $s_{i1}$; and
setting the computed arbitrary value $R_i$ of the device and the first integer $s_{i1}$ as the parameters for the device, wherein the arbitrary value $R_i$ of the device is computed based on the arbitrary first value $R_{i1}$ and the second random number $r_{i2}$, and wherein the first integer $s_{i1}$ is computed based on the second random number $r_{i2}$, the master secret key x, the arbitrary value $R_i$ of the device, the identity $id_i$ of the device and a prime number q obtained from the parameters associated with the master public key mpk.

22. A method, comprising:
receiving, by a first device, instructions from a secure server to compute a private key $sk_i$ based on a first set of parameters received from the secure server and based on a first random number $r_{i1}$ generated by the first device, wherein the first set of parameters is generated by the secure server based on a second random number $r_{i2}$ generated by the secure server, a first set of components, a master secret key x, and parameters associated with a master public key mpk, wherein the first set of components is generated by the first device and transmitted to the secure server, wherein the first set of components comprises the first random number $r_{i1}$, an arbitrary first value $R_{i1}$, and an identity $id_i$ of the first device, and wherein the arbitrary first value $R_{i1}$ is generated based on the first random number $r_{i1}$; and
communicating, by the first device, with a second device to generate a common session key SK by using a self-certified identity based signature scheme, wherein the common session key SK is for encoding digital communications between the first and second devices with respect to an extended Transport Layer Security (TLS) protocol or an extended Datagram Transport Layer Security protocol (DTLS), wherein the identity $id_i$ of the first device is included in a certificate message of the first device and an identity $id_j$ of the second device is included in a certificate message of the second device, wherein the self-certified identity based signature scheme is dictated by the private key $sk_i$ and a private key $sk_j$ computed by the second device,
wherein the first set of parameters is generated based on:
retrieving the arbitrary first value $R_{i1}$ and the identity $id_i$ of the first device from the first set of components;
computing an arbitrary value $R_i$ of the first device and a first integer $s_{i1}$; and
setting the computed arbitrary value $R_i$ of the first device and the first integer $s_{i1}$ as the first set of parameters for the first device, wherein the arbitrary value $R_i$ of the first device is computed based on the arbitrary first value $R_{i1}$ and the second random number $r_{i2}$, and wherein the first integer $s_{i1}$ is computed based on the second random number $r_{i2}$, the master secret key x, the arbitrary value $R_i$ of the first device, the identity $id_i$ of the first device, and a prime number q obtained from the parameters associated with the master public key mpk.

23. A first device, comprising:
a processor; and
a non-transitory medium readable having processor-executable instructions stored thereon, wherein the processor-executable instructions, when executed by the processor, facilitate:
receiving instructions from a secure server to compute a private key $sk_i$ based on a first set of parameters received from the secure server and based on a first random number $r_{i1}$ generated by the first device, wherein the first set of parameters is generated by the secure server based on a second random number $r_{i2}$ generated by the secure server, a first set of components, a master secret key x, and parameters associated with a master public key mpk, wherein the first set of components is generated by the first device and transmitted to the secure server, wherein the first set of components comprises the first random number $r_{i1}$, an arbitrary first value $R_{i1}$, and an identity $id_i$ of the first device, and wherein the arbitrary first value $R_{i1}$ is generated based on the first random number $r_{i1}$; and communicating with a second device to generate a common session key SK by using a self-certified identity based signature scheme, wherein the common session key SK is for encoding digital communications between the first and second devices with respect to an extended Transport Layer Security (TLS) protocol or an extended Datagram Transport Layer Security protocol (DTLS), wherein the identity $id_i$ of the first device is included in a certificate message of the first device and an identity $id_j$ of the second device is included in a certificate message of the second device, wherein the self-certified identity based signature scheme is dictated by the private key $sk_i$ and a private key $sk_j$ computed by the second device, wherein the first set of parameters is generated based on:
retrieving the arbitrary first value $R_{i1}$, the identity $id_i$ of the first device, and a homomorphic encryption value c from the first set of components, wherein the arbitrary first value $R_{i1}$ is generated based on the first random number $r_{i1}$ and the homomorphic encryption value c is generated by providing the first random number $r_{i1}$ and a prime number q obtained from the parameters associated with the master public key mpk to an additive homomorphic encryption function HEnc( ); and setting an arbitrary value $R_i$ of the first device and a first integer $s_{i1}$ as the parameters for the first device, wherein the arbitrary value $R_i$ of the first device is computed based on the arbitrary first value $R_{i1}$ and the second random number $r_{i2}$, and wherein the first integer $s_{i1}$ is computed by providing the second random number $r_{i2}$, the homomorphic encryption value c, the master secret key x, the arbitrary value $R_i$ of the first device, the identity $id_i$ of the first device, and the prime number q to the additive homomorphic encryption function HEnc( ).

* * * * *

UNITED STATES PATENT AND TRADEMARK OFFICE
CERTIFICATE OF CORRECTION

Page 1 of 2

PATENT NO. : 11,563,565 B2
APPLICATION NO. : 16/535437
DATED : January 24, 2023
INVENTOR(S) : Yang et al.

It is certified that error appears in the above-identified patent and that said Letters Patent is hereby corrected as shown below:

In the Claims

Claim 1: Column 35, Line 48: "generated by the device, an arbitrary first value $R_i$," should read -- generated by the device, an arbitrary first value $R_{i1}$, --.

Claim 1: Column 35, Line 50: "arbitrary first value $R_i$ is generated based on the first" should read -- arbitrary first value $R_{i1}$ is generated based on the first --.

Claim 6: Column 36, Line 39: "first value $R_{i1}$ is defined by $R_i = g^{r_{i1}^{-1}}$ , the homomorphic" should read -- first value $R_{i1}$ is defined by $R_{i1} = g^{r_{i1}^{-1}}$ , the homomorphic --.

Claim 8: Column 37, Line 28: "$sk_j$," should read -- $sk_j$; --.

Claim 8: Column 37, Line 33: "retrieving the arbitrary first value $R_i$ and the identity $id_i$," should read -- retrieving the arbitrary first value $R_{j1}$ and the identity $id_j$ --.

Claim 8: Column 37, Line 42: "based on the arbitrary first value $R_j$ and the second" should read -- based on the arbitrary first value $R_{j1}$ and the second --.

Claim 9: Column 37, Line 57: "setting the computed arbitrary value R of the first device" should read -- setting the computed arbitrary value $R_i$ of the first device --.

Claim 14: Column 39, Line 44: "a first integer $s_{i1}$; and" should read -- a first integer $s_{j1}$; and --.

Claim 15: Column 39, Line 57: "device is configured to compute the private key $sk_i$, wherein" should read -- device is configured to compute the private key $sk_j$, wherein --.

Claim 17: Column 40, Line 36: "retrieving the arbitrary first value $R_i$ and the identity $id_i$," should read -- retrieving the arbitrary first value $R_{i1}$ and the identity $id_i$ --.

Signed and Sealed this
Sixth Day of June, 2023

Katherine Kelly Vidal
*Director of the United States Patent and Trademark Office*

Claim 18: Column 40, Line 52: "retrieving the arbitrary first value $R_i$, the identity $id_i$ of the" should read -- retrieving the arbitrary first value $R_{i1}$, the identity $id_i$ of the --.